US012741633B2

(12) United States Patent
Baba et al.

(10) Patent No.: US 12,741,633 B2
(45) Date of Patent: Sep. 22, 2026

(54) PROCESSING METHOD, PROCESSING SYSTEM, AND PROCESSING DEVICE

(71) Applicant: DENSO CORPORATION, Kariya-city (JP)

(72) Inventors: Atsushi Baba, Kariya-city (JP); Tetsuya Tohdo, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 388 days.

(21) Appl. No.: 18/353,778

(22) Filed: Jul. 17, 2023

(65) Prior Publication Data

US 2023/0356714 A1 Nov. 9, 2023

Related U.S. Application Data

(63) Continuation of application No. PCT/JP2021/048802, filed on Dec. 28, 2021.

(30) Foreign Application Priority Data

Jan. 22, 2021 (JP) ................................ 2021-009033

(51) Int. Cl.

*B60W 30/09* (2012.01)
*B60W 40/04* (2006.01)
*B60W 50/02* (2012.01)

(52) U.S. Cl.

CPC ........... *B60W 30/09* (2013.01); *B60W 40/04* (2013.01); *B60W 50/0205* (2013.01);

(Continued)

(58) Field of Classification Search

CPC ... B60W 2050/021; B60W 2050/0215; B60W 2420/403; B60W 2420/408; B60W 2520/10; B60W 2520/12; B60W 2552/10; B60W 2552/53; B60W 2554/402; B60W 2554/4041; B60W 2554/801; B60W 2554/802; B60W 2555/60; B60W 2556/40; B60W 2556/50; B60W 2720/10; B60W 2720/14; B60W 2720/24; B60W 30/09;

(Continued)

(56) References Cited

U.S. PATENT DOCUMENTS 11,267,462 B2 * 3/2022 Vyas .................... B60W 30/09
11,582,112 B2 * 2/2023 Ukai ................ H04L 12/40143

(Continued)

FOREIGN PATENT DOCUMENTS

JP 2007274594 A * 10/2007
JP 2009274594 A * 11/2009

(Continued)

*Primary Examiner* — Babar Sarwar
(74) *Attorney, Agent, or Firm* — Precision Patents, P.C.

(57) ABSTRACT

A processing method executed by a processor for performing a process related to driving control of a host moving object includes: monitoring an abnormality in detection information that is generated by detecting an internal and external environment of the host moving object; and in response to determining the abnormality being occurred, setting a constraint or restriction on the driving control according to the detection information using a safety model, which is in compliance with a driving policy and is generated by modeling safety of intended functionality.

16 Claims, 34 Drawing Sheets

(52) U.S. Cl.
CPC ................. *B60W 2050/021* (2013.01); *B60W 2050/0215* (2013.01); *B60W 2520/10* (2013.01); *B60W 2520/12* (2013.01); *B60W 2554/402* (2020.02); *B60W 2554/4041* (2020.02); *B60W 2554/802* (2020.02); *B60W 2720/10* (2013.01); *B60W 2720/14* (2013.01); *B60W 2720/24* (2013.01)

(58) Field of Classification Search
CPC ............. B60W 40/04; B60W 50/0205; B60W 60/0016; B60W 60/00186; B60W 60/0059; G08G 1/16
See application file for complete search history.

(56) References Cited

U.S. PATENT DOCUMENTS

2012/0245758 A1* 9/2012 Mizuta .................. B60W 40/09 701/1
2014/0156133 A1* 6/2014 Cullinane ............. B60R 16/023 701/23
2014/0195141 A1* 7/2014 Nagata ...................... B60T 7/22 701/301
2014/0324297 A1* 10/2014 Kim ...................... B60W 10/20 701/48
2016/0004254 A1* 1/2016 Matsumoto ......... B60W 50/045 701/23
2016/0147921 A1 5/2016 Vanholme
2016/0362116 A1* 12/2016 Otsuka .............. B60W 60/0051
2016/0368492 A1* 12/2016 Al-Stouhi ............. B60W 30/09
2018/0194364 A1* 7/2018 Asakura ............ B60W 60/0059
2019/0106104 A1* 4/2019 Inoue ........................ B60T 7/22
2019/0193731 A1* 6/2019 Irie ....................... B60W 30/12
2020/0013292 A1* 1/2020 Switkes ................ B60W 30/09
2020/0070817 A1* 3/2020 Vyas ..................... B60W 40/09
2020/0233437 A1* 7/2020 Hase .................... G05D 1/0291
2020/0391757 A1 12/2020 Kim et al.

FOREIGN PATENT DOCUMENTS

WO 2018/115963 A2 6/2018
WO 2019/180506 A2 9/2019
WO 2020/035728 A2 2/2020

* cited by examiner

FIG. 1

| Terms | Description |
| --- | --- |
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function".<br>Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic".<br>Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved".<br>Lagging measure may be defined as "metrics that are assessed after deployment of an automated driving system and provides confirmation that conformance with the safety-by-design has been achieved". Herein, safety may be defined with consideration of statistics or social acceptability other than absolute metrics. |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk".<br>Leading measure may be defined as "metrics that are derived from data that is assessed prior to deployment of an automated driving system indicating that the automated driving system conforms with safety-by-design to achieve avoidance of unreasonable risk". Herein, safety may be defined with consideration of statistics or social acceptability other than absolute metrics. |

FIG. 2

| Terms | Description |
|---|---|
| High definition map (HD map) | High definition map may be defined as "maps with high level precision mostly used in the context of automated driving system to give the vehicle precise information about the road environment". |
| Path planning | Path planning may be defined as "identification and selection of the vehicle trajectory for every defined time-step in response to the situational awareness, destination and other constraints". |
| Operational design domain (ODD) | Operational design domain may be defined as "specific conditions under which a given driving automation system is designed to function".<br>Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Scenario | Scenario may be defined as "description of the temporal relationship between several scenes, with goals and values within a specified situation in a sequence of scenes influenced by actions and events".<br>Scenario may be defined as "description of the consecutive time series of activities integrating the subject vehicle, all its external environment and their interactions in the process of performing a certain driving task".<br>Scenario may be defined as "high level descriptions of common driving situations in which reasonable and foreseeable assumptions about the behavior of other road users shall be made". |
| Scene | Scene may be defined as "snapshot of the environment including the scenery, dynamic elements, and all actors and observers self-representations, and the relationships among those entities".<br>Scene may be defined as "snapshot of the scenario at a given point of time". |
| Use case | Use case may be defined as "description of a suite of related scenarios". |
| Simulation | Simulation may be defined as "approximated imitation of selected behavioral characteristics of one physical or abstract system by a static or dynamic model". |

FIG. 3

| Terms | Description |
|---|---|
| Driving policy (DP) | Driving policy may be defined as "strategy and rules defining acceptable control actions at vehicle level".<br>Driving policy may be decision-making level implementation of the vehicle level safety strategy (VLSS).<br>Driving policy may be a mapping from a sensing state (a description of the world around us) into a driving command (e.g., the command is lateral and longitudinal accelerations for the coming second, which determines where and at what speed should the car be in one second from now). |
| Vehicle level safety strategy (VLSS) | VLSS may represent the set of requirements for the function under development used to support SOTIF related design, verification and validation activities.<br>VLSS may be the overarching specification that ensure the overall AV safety. |
| Safety of the Intended functionality (SOTIF) | SOTIF may be defined as "absence of unreasonable risk due to these potentially hazardous behaviors related to such limitations".<br>SOTIF may be defined as "absence of unreasonable risk due to hazards resulting from functional insufficiencies of the intended functionality or its implementation".<br>SOTIF may be defined as "absence of unreasonable risk due to hazards resulting from functional insufficiencies of the intended functionality or by reasonably foreseeable misuse by road users". |
| Proper response | Proper response may be defined as "the set of corrective actions that the driving policy might require to maintain the SOTIF of an autonomous vehicle (AV) during nominal conditions". |
| Unreasonable risk | Unreasonable risk may be defined as "risk judged to be unacceptable in a certain context according to valid societal moral concepts". |
| Unreasonable situation | Unreasonable situation may be defined as "a situation where some other agent is not behaving reasonably per the assumptions used in the model". |
| Misuse | Misuse may be defined as "usage of the system by a human in a way not intended by the manufacturer or the service provider". |

FIG. 4

| Terms | Description |
|---|---|
| Safety envelope | The definition of a "safety envelope" may be a common concept that can be used to address all the principles that the driving policy might comply with. According to this concept, the autonomous vehicle might have one or more boundaries around the ego-vehicle, where the violation of one or more of these boundaries result in different responses by the autonomous vehicle.<br>Safety envelopes may define a physics based margin around the automated vehicle typically combined with defined assumptions about the reasonably foreseeable worst case behavior of others to provide a foundational building block of a safety-related model.<br>Safety envelope may be the basic construct for understanding if the autonomous vehicle is in a high risk scenario.<br>Safety envelope may be defined to demarcate boundaries, margins or buffer areas not only around the ego-vehicle but also around other vehicles, around pedestrians or around stationary objects. |
| DDT fallback | DDT fallback may be defined as "response by the driver or automation system to either perform the DDT or transition to a minimal risk condition after the occurrence of a failure(s) or detection of a functional insufficiency or upon detection of a potentially hazardous behavior".<br>DDT fallback may be defined as "takeover/fallback condition and schemes of transition control from autonomous to control by driver or other system with their relevant use cases". |
| Minimal risk condition (MRC) | Minimal risk condition may be defined as "vehicle state in order to reduce the risk of a harm, when a given trip cannot be completed".<br>Minimal risk condition may be defined as "condition to which a user or an automated driving system may bring a vehicle after performing the minimal risk maneuver in order to reduce the risk of a crash when a given trip cannot be completed". |
| Minimal risk maneuver (MRM) | Minimal risk maneuver may be defined as "automated driving system' s capability of transitioning the vehicle between nominal and minimal risk conditions". |
| Degradation | Degradation may be defined as "state or transition to a state of the item or element with reduced functionality, performance, or both". |

FIG. 5

| Terms | Description |
|---|---|
| User | User may be defined as "general term referencing the human role in driving automation". |
| Fallback ready user | Fallback ready user may be defined as "user who is able to operate the vehicle and is capable of intervening to perform the DDT fallback as required and within a time span appropriate for the defined non-driving occupation". |
| Road user | Road user may be defined as "anyone who uses a road including sidewalk and other adjacent spaces".<br>Road users may include pedestrians, cyclists, other VRUs, and vehicles (for example, human driven motor vehicles or ADS-equipped vehicles). |
| Vulnerable road user (VRU) | Vulnerable road user may be defined as "non-protected road user such as motorcyclists, cyclists, pedestrians and persons with disabilities or reduced mobility and orientation". |
| Non vulnerable road user | Non vulnerable road user may be defined as "protected road users such as users in other vehicles, trucks, construction and agricultural machines". |
| Other road user | Other road user may be defined as "vulnerable and non-vulnerable road users with no role in the ego automated vehicle". |
| Response time | Response time may be defined as "the time it takes for a road user to initiate an appropriate response (e.g., braking/steering/accelerating/stopping) due to a specific stimulus in a given scenario" |

PROCESSING METHOD
S100
DETECTION INFO HAS ERROR (ABNORMAL SENSING) ?
NO
YES
S2100
ABNORMAL SENSING IS SECOND LONGITUDINAL DIRECTION SENSOR?
NO
YES
S2101
PLAN DRIVING CONTROL
S2102
SET CONSTRAINT/ RESTRICTION
S101
PLAN DRIVING CONTROL
S102
SET CONSTRAINT/ RESTRICTION
S103
CONSTRAIN/RESTRICT DRIVING CONTROL
END

FIG. 38

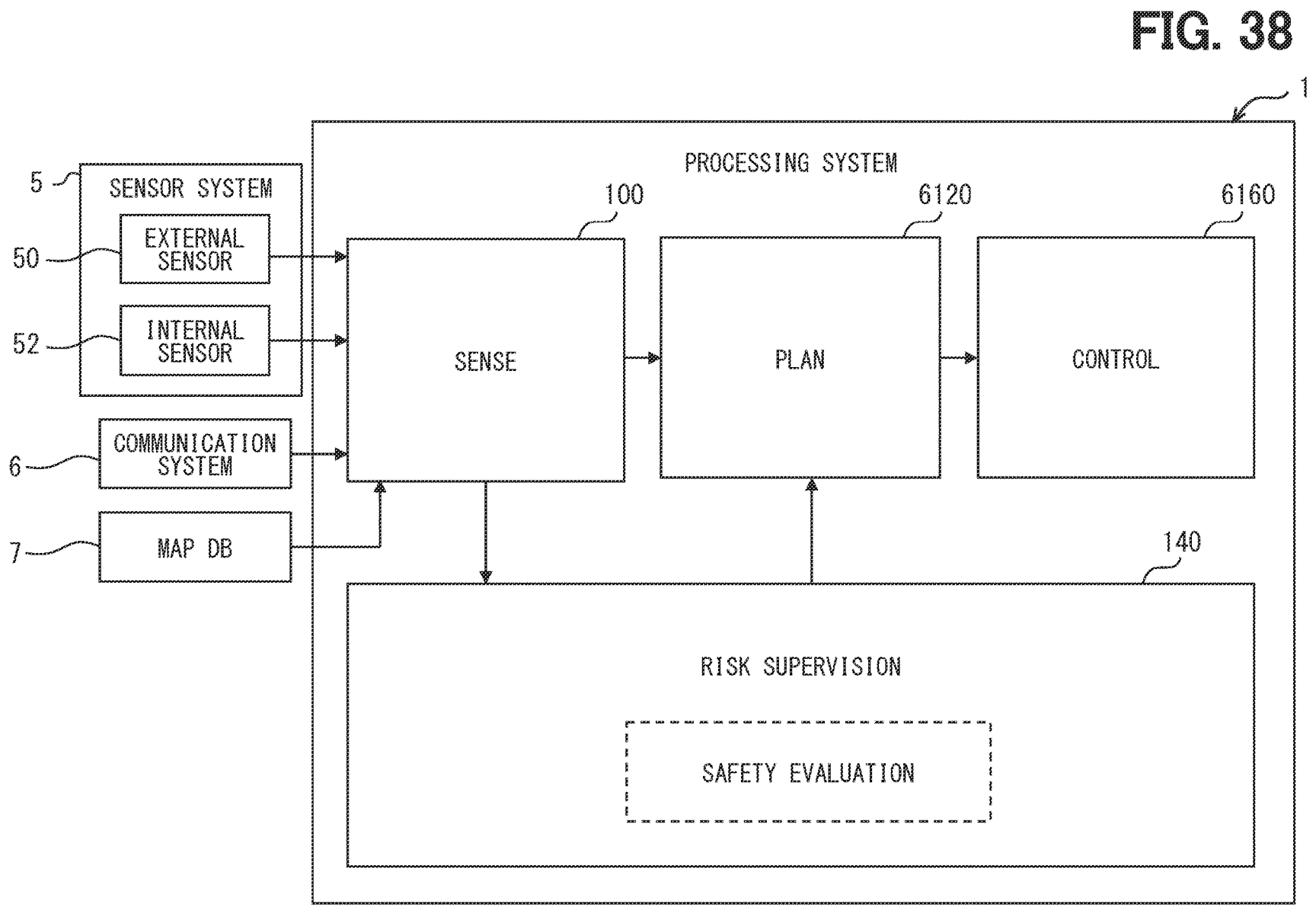

1
PROCESSING SYSTEM
100 SENSE
6120 PLAN
6160 CONTROL
140 RISK SUPERVISION
SAFETY EVALUATION
5 SENSOR SYSTEM
50 EXTERNAL SENSOR
52 INTERNAL SENSOR
6 COMMUNICATION SYSTEM
7 MAP DB

Figure 40:
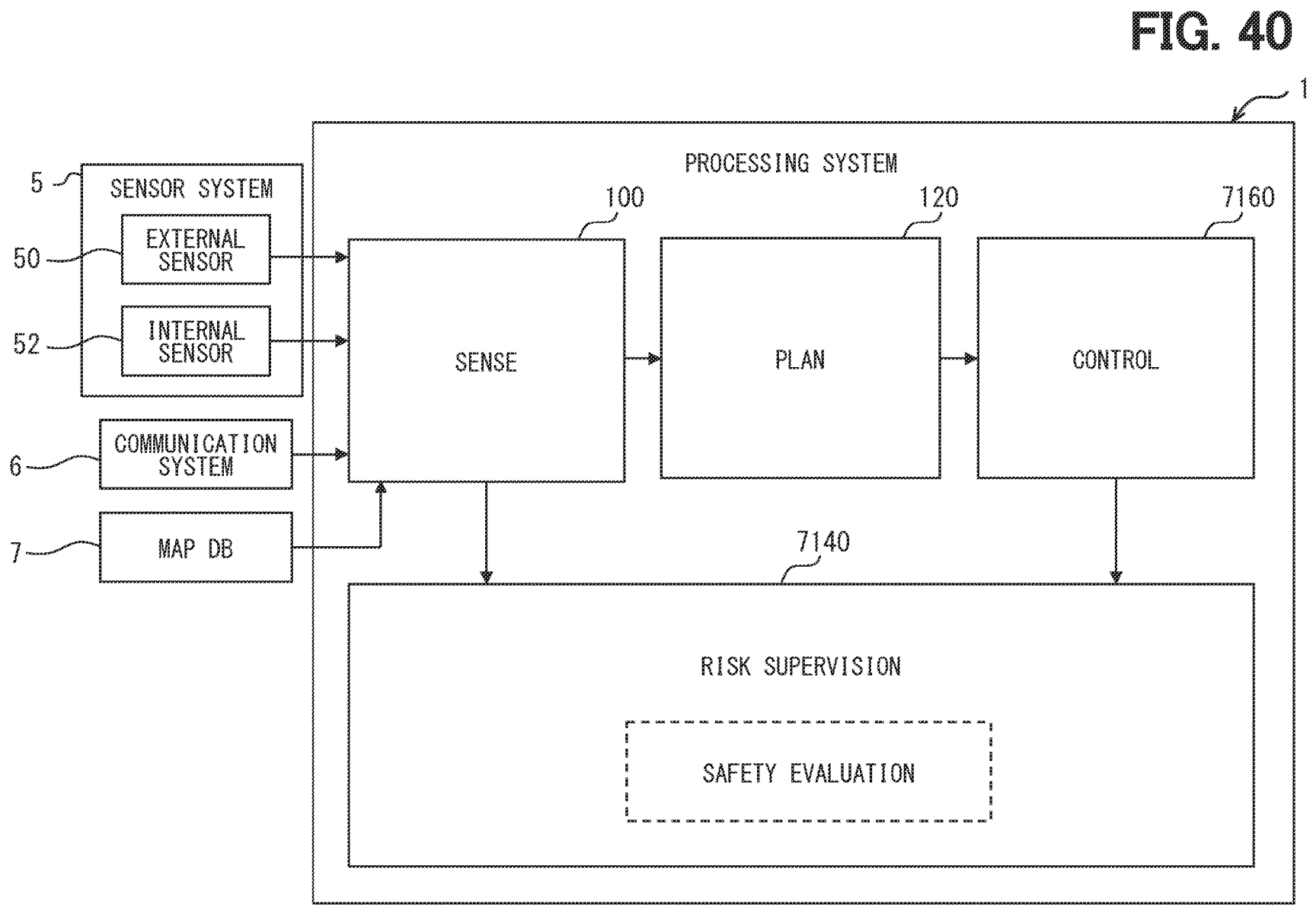

PROCESSING SYSTEM

7160 CONTROL

120 PLAN

100 SENSE

7140 RISK SUPERVISION

SAFETY EVALUATION

5 SENSOR SYSTEM

50 EXTERNAL SENSOR

52 INTERNAL SENSOR

6 COMMUNICATION SYSTEM

7 MAP DB

Figure 42:
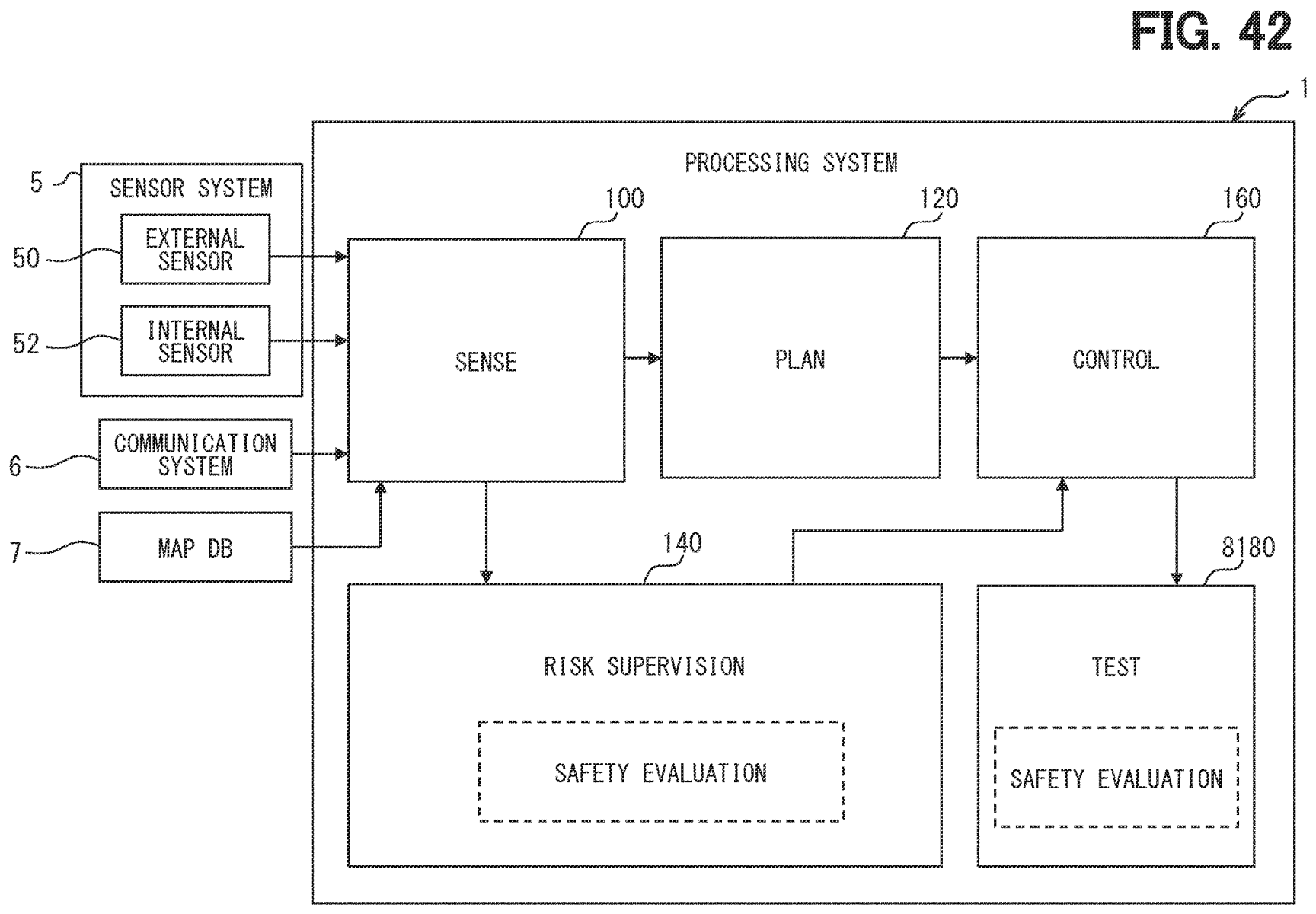

PROCESSING SYSTEM

100 SENSE

120 PLAN

160 CONTROL

140 RISK SUPERVISION

SAFETY EVALUATION

8180 TEST

SAFETY EVALUATION

5 SENSOR SYSTEM

50 EXTERNAL SENSOR

52 INTERNAL SENSOR

6 COMMUNICATION SYSTEM

7 MAP DB

1
PROCESSING SYSTEM
5
SENSOR SYSTEM
50
EXTERNAL SENSOR
52
INTERNAL SENSOR
6
COMMUNICATION SYSTEM
7
MAP DB
100
SENSE
120
PLAN
160
CONTROL
140
RISK SUPERVISION
SAFETY EVALUATION
8180
TEST
SAFETY EVALUATION
8001

FIG. 45

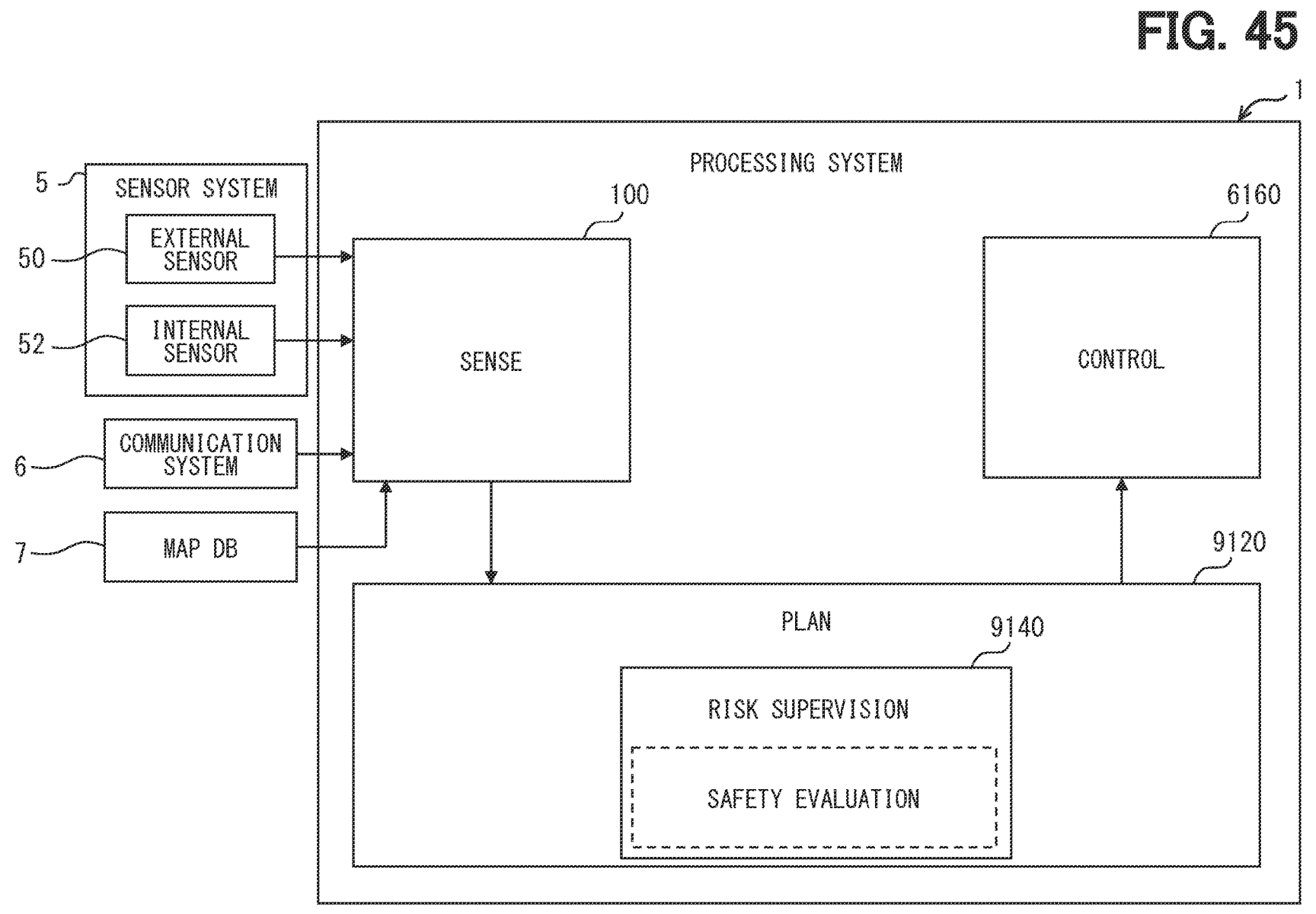

1
PROCESSING SYSTEM
6160
CONTROL
9120
PLAN
9140
RISK SUPERVISION
SAFETY EVALUATION
100
SENSE
5
SENSOR SYSTEM
50
EXTERNAL SENSOR
52
INTERNAL SENSOR
6
COMMUNICATION SYSTEM
7
MAP DB

PROCESSING METHOD, PROCESSING SYSTEM, AND PROCESSING DEVICE

CROSS REFERENCE TO RELATED APPLICATIONS

The present application is a continuation application of International Patent Application No. PCT/JP2021/048802 filed on Dec. 28, 2021, which designated the U.S. and claims the benefit of priority from Japanese Patent Application No. 2021-009033 filed on Jan. 22, 2021. The entire disclosures of all of the above applications are incorporated herein by reference.

TECHNICAL FIELD

The present disclosure relates to a processing technique for performing processing related to driving control of host moving object.

BACKGROUND

Conventionally, driving control related to a navigation operation of a host vehicle is planned in accordance with detection information related to an internal and external environment of the host vehicle.

SUMMARY

The present disclosure provides a processing method, which is executed by a processor for performing a process related to a driving control of a host moving object. The processing method includes: monitoring an abnormality in detection information that is generated by detecting an internal and external environment of the host moving object; and in response to determining the abnormality being occurred, setting a constraint or restriction on the driving control according to the detection information using a safety model, which is in compliance with a driving policy and is generated by modeling safety of intended functionality.

BRIEF DESCRIPTION OF DRAWINGS

Objects, features and advantages of the present disclosure will become apparent from the following detailed description made with reference to the accompanying drawings.

FIG. 1 is an explanatory table showing an explanation of terms in the present disclosure.

FIG. 2 is an explanatory table showing an explanation of terms in the present disclosure.

FIG. 3 is an explanatory table showing an explanation of terms in the present disclosure.

FIG. 4 is an explanatory table showing an explanation of terms in the present disclosure.

FIG. 5 is an explanatory table showing an explanation of terms in the present disclosure.

FIG. 38 is a flowchart showing a processing method according to a sixth embodiment.

FIG. 40 is a block diagram showing a processing system according to a seventh embodiment.

FIG. 42 is a block diagram showing a processing system according to an eighth embodiment.

FIG. 45 is a block diagram showing a processing system according to a ninth embodiment.

DETAILED DESCRIPTION

Figure 6:
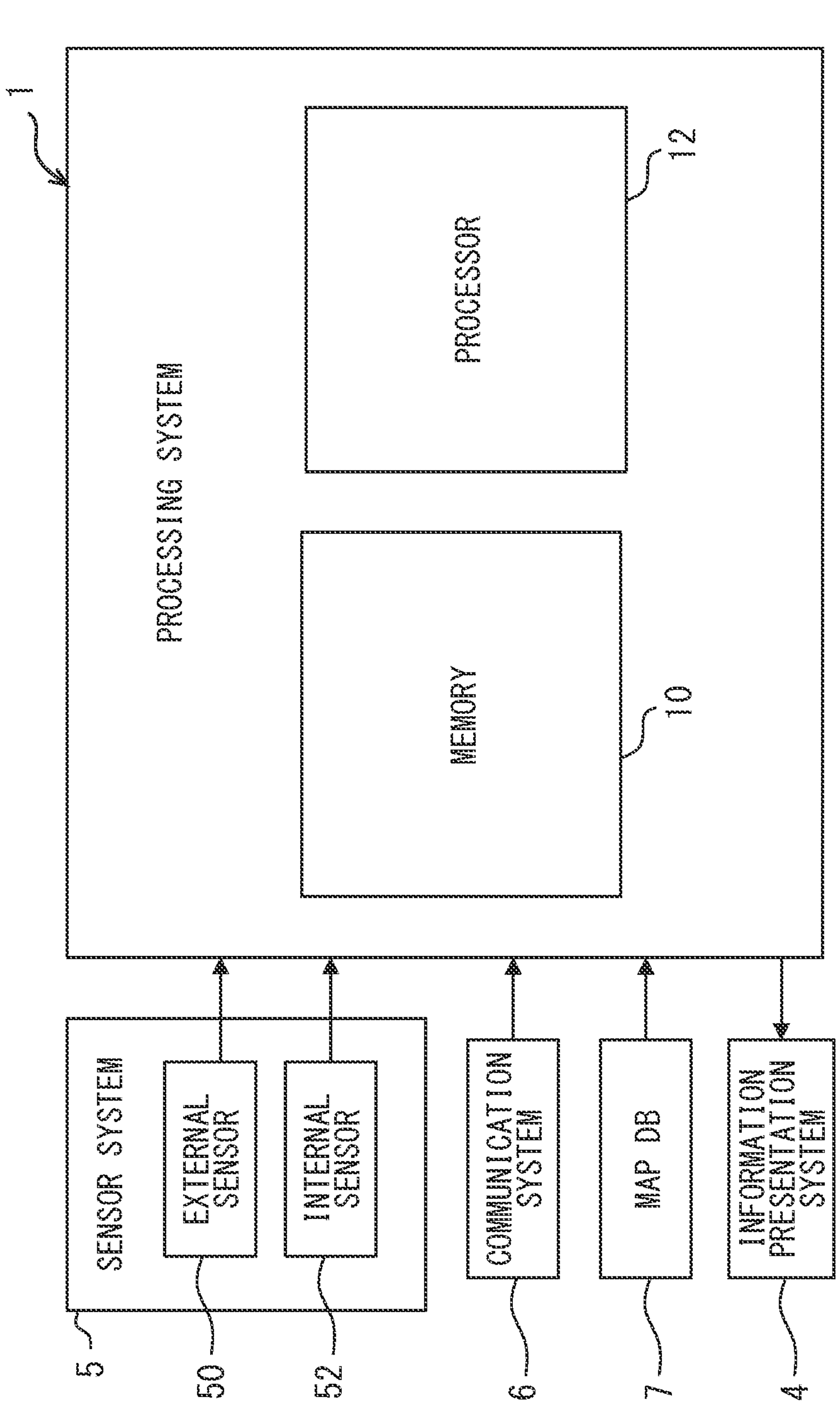
FIG. 6 is a block diagram showing a processing system according to a first embodiment.

Driving control related to a navigation operation of a host vehicle is planned in accordance with detection information related to an internal and external environment of the host vehicle. Therefore, when it is determined, based on a safety model generated corresponding to a driving policy and detected information, that the vehicle is potentially responsible for an accident, a driving control of the vehicle is restricted or constrained. In such a configuration, it is difficult to ensure an accuracy of the driving control in some cases.

According to a first aspect of the present disclosure, a processing method, which is executed by a processor for performing a process related to a driving control of a host moving object, includes: monitoring an abnormality in detection information that is generated by detecting an internal and external environment of the host moving object; and in response to determining the abnormality being occurred, setting a constraint or restriction on the driving control according to the detection information using a safety model, which is in compliance with a driving policy and is generated by modeling safety of intended functionality.

According to a second aspect of the present disclosure, a processing system, which executes a process related to a driving control of a host moving object, includes a computer-readable non-transitory storage medium and a processor, by executing a program stored in the computer-readable non-transitory storage, configured to: monitor an abnormality in detection information that is generated by detecting an internal and external environment of the host moving object; and in response to determining the abnormality being occurred, set a constraint or restriction on the driving control according to the detection information using a safety model, which is in compliance with a driving policy and is generated by modeling safety of intended functionality.

According to a third aspect of the present disclosure, a computer-readable non-transitory storage medium, which stores instructions of a processing program to be executed by a processor, is provided. The processor performs a process related to a driving control of a host moving object by executing the instructions, and the instructions include: monitoring an abnormality in detection information that is generated by detecting an internal and external environment of the host moving object; and in response to determining the abnormality being occurred, setting a constraint or restriction on the driving control according to the detection information using a safety model, which is in compliance with a driving policy and is generated by modeling safety of intended functionality.

According to a fourth aspect of the present disclosure, a processing device, which is mountable to a host moving object and executes a process related to a driving control of the host moving object, includes a computer-readable non-transitory storage medium and a processor, by executing a program stored in the computer-readable non-transitory storage, configured to: monitor an abnormality in detection information that is generated by detecting an internal and external environment of the host moving object; and in response to determining the abnormality being occurred, set a constraint or restriction on the driving control according to the detection information using a safety model, which is in compliance with a driving policy and is generated by modeling safety of intended functionality.

According to the first to fourth aspects, when an abnormality is occurred in the monitored detection information, the constraint or restriction according to the detection information is set to the driving control based on the safety model, which is in compliance with a driving policy and is generated by modeling safety of intended functionality. With this configuration, it is possible to secure the accuracy of driving control by properly setting the constraint or restriction in a scene where an abnormality is occurred in the detection information.

Hereinafter, various embodiments of the present disclosure will be described with reference to the drawings. Note that the same reference symbols are assigned to corresponding components in each embodiment, and redundant description may be omitted. When only a part of the configuration is described in an embodiment, the configuration of the other embodiments described before may be applied to remaining part of the configuration. In addition to the combinations of configurations specifically shown in various embodiments, the configurations of various embodiments can be partly combined even if not explicitly suggested, unless such combinations are contradictory.

FIG. 1 to FIG. 5 provide explanations of terms associated with each embodiment of the present disclosure. However, the definitions of terms should not be interpreted as being limited to the explanations shown in FIG. 1 to FIG. 5. The definitions of terms should be interpreted under a condition that the interpretation does not deviate a spirit of the present disclosure.

First Embodiment

A processing system 1 of the first embodiment illustrated in FIG. 6 performs a process related to driving control of a host moving object (hereinafter, referred to as an "driving control process"). The host moving object, which is a target of driving control process executed by the processing system 1, is a host vehicle 2 shown in FIG. 7. From a perspective of the host vehicle 2, the host vehicle 2 corresponds to an ego-vehicle. For example, when all of the processing system 1 is mounted to the host vehicle 2, the host vehicle 2 may be referred to as an ego-vehicle with respect to the processing system 1.

The host vehicle 2 performs an automated driving. The automated driving is classified into multiple levels according to a degree of manual intervention by the driver in a dynamic driving task (hereinafter, referred to as "DDT"). The automated driving may be implemented by an autonomous driving control, such as conditional driving automation, advanced driving automation, or full driving automation, where the system in operation performs all of the DDTs. The automated driving may be implemented in advanced driving assistance control, such as driving assistance or partial driving automation, where the driver as a vehicle occupant performs partial or all of the DDTs. The automated driving may be implemented by either autonomous driving control or advanced driving assistance control, combination of autonomous driving control and advanced driving assistance control, or switching between the autonomous control and advanced driving assistance control.

Figure 7:
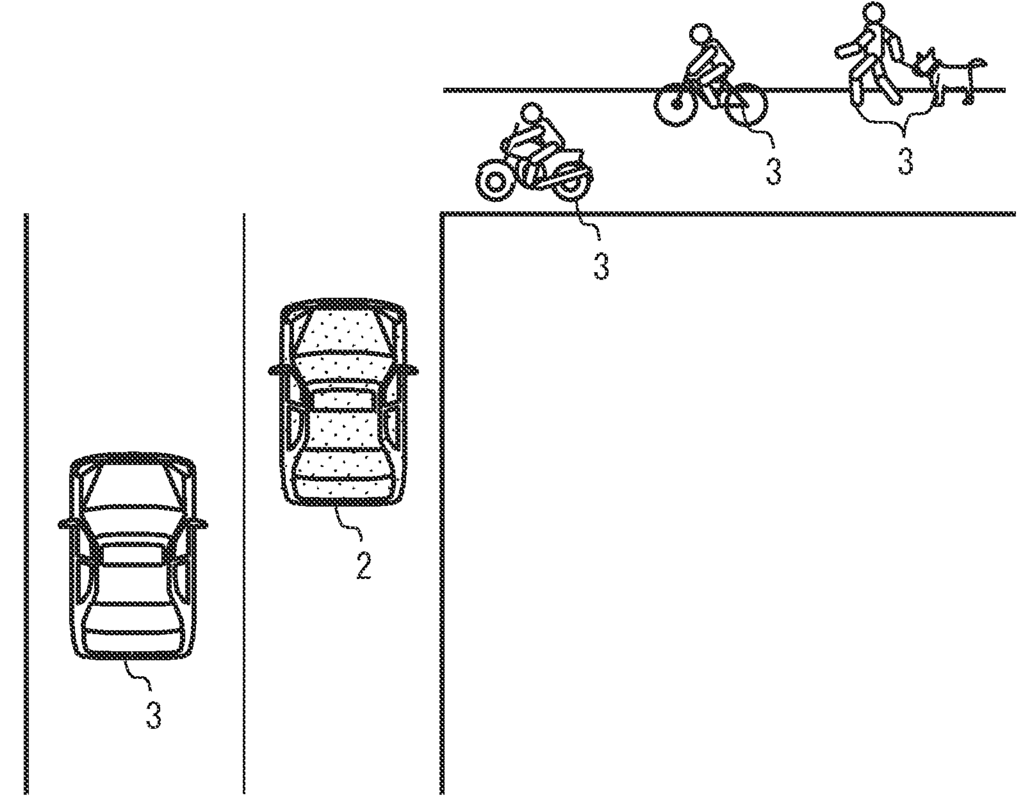
FIG. 7 is a schematic diagram showing a traveling environment of a host vehicle to which the first embodiment is applied.
Figure 8:
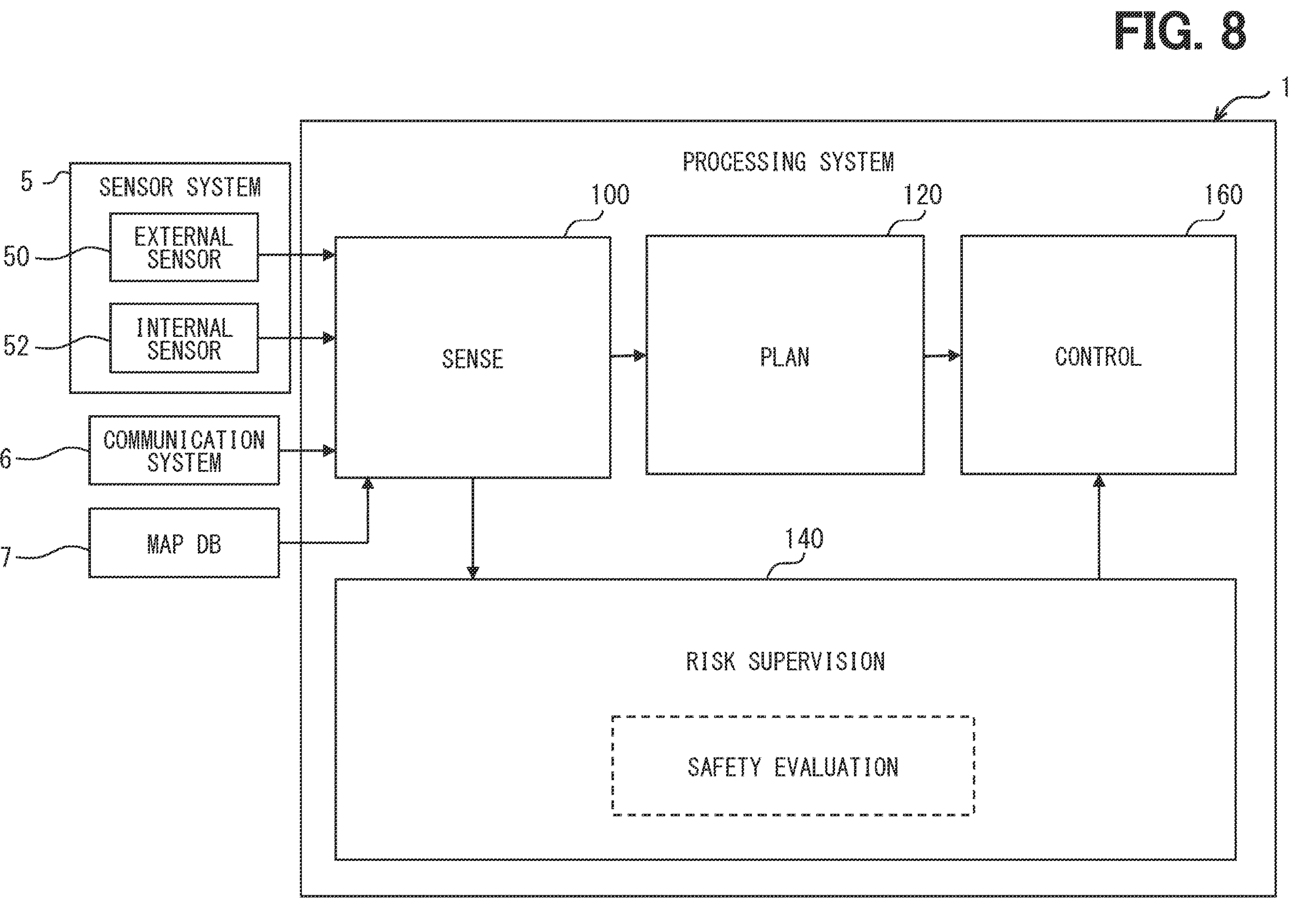
FIG. 8 is a block diagram showing a processing system according to the first embodiment.

The host vehicle 2 is equipped with a sensor system 5, a communication system 6, a map DB (Data Base) 7, and an information presentation system 4 as shown in FIG. 6 and FIG. 8. The sensor system 5 acquires sensor data, which are usable by the processing system 1, by detecting an external environment and internal environment of the host vehicle 2. The sensor system 5 includes an external sensor 50 and an internal sensor 52.

The external sensor 50 may detect an object existing in the external environment of the host vehicle 2. For example, the external sensor 50, which detects an object, may be at least one of a camera, a LiDAR (Light Detection and Ranging/Laser Imaging Detection and Ranging), a laser radar, a millimeter wave radar, an ultrasonic sonar, or the like. The external sensor 50 may detect a condition of the atmosphere in the external environment of the host vehicle 2. For example, the external sensor 50, which detects the atmosphere condition, may be at least one of an external temperature sensor or a humidity sensor.

The internal sensor 52 may detect a particular physical quantity related to vehicle motion (hereinafter, referred to as a kinetic physical quantity) in the internal environment of the host vehicle 2. For example, the internal sensor 52, which detects the physical quantity, may be at least one of a speed sensor, an acceleration sensor, a gyro sensor, or the like. The internal sensor 52 may detect a condition of an occupant in the internal environment of the host vehicle 2. For example, the internal sensor 52, which detects occupant condition, may be at least one of an actuator sensor, a driver status monitor, a biosensor, a seating sensor, an in-vehicle device sensor, or the like. As the actuator sensor, at least one of an accelerator sensor, a brake sensor, a steering sensor, or the like, which detects a driving operation state of the occupant regarding a motion actuator of the host vehicle 2, may be used.

The communication system 6 acquires, via wireless communication, communication data usable by the processing system 1. The communication system 6 may receive positioning signals from artificial satellites of GNSS (Global Navigation Satellite System), which exist outside of the host vehicle 2. For example, the communication system 6, which performs positioning, may be a GNSS receiver or the like. The communication system 6 may transmit and receive communication signals to and from a V2X system, which exists outside of the host vehicle 2. For example, the communication system 6, which performs V2X communication, may be at least one of a DSRC (Dedicated Short Range Communications) communication device, a cellular V2X (C-V2X) communication device, or the like. The communication system 6 may transmit and receive communication signals to and from a terminal device, which exists inside of the host vehicle 2. For example, the communication system 6, which communicates with the terminal device, may be at least one of Bluetooth (registered trademark) equipment, Wi-Fi (registered trademark) equipment, infrared communication equipment, or the like.

The map DB 7 stores map data, which are usable by the processing system 1. The DB 7 includes at least one type of non-transitory tangible storage medium such as a semiconductor memory, a magnetic medium, and an optical medium. The map DB 7 may be a database of a locator. The locator estimates state quantities of the host vehicle 2, which includes its own position. The map DB 7 may be a database of a navigation unit. The navigation unit navigates a route for the host vehicle 2. The map DB 7 may be implemented as combination of multiple types of DB.

For example, the map DB 7 acquires and stores the latest map data through communication with an external center via the communication system 6 of V2X function. The map data is two-dimensional or three-dimensional data representing a traveling environment of the host vehicle 2. Digital data of a high definition map may be used as the three-dimensional map data. The map data may include road data representing, for example, at least one of positional coordinates of a road structure, road shape, road surface condition of the road. The map data may include, for example, mark data representing at least one of road sign, road marking, and position coordinates and shapes of boundary lines. The mark data included in the map data may represent a traffic sign, an arrow marking, a lane marking, a stop line, a direction sign, a landmark beacon, a rectangular-shaped sign, a business sign, a line pattern change of the road, or the like among the landmark. The map data may include, for example, structure data representing at least one of the position coordinates and shapes of buildings and traffic lights, which face the road. The mark data included in the map data may represent a streetlight, an edge of road, a reflective plate, a pole, or a back surface of the road sign among the landmark.

The information presentation system 4 presents notification information to occupants including the driver of the host vehicle 2. The information presentation system 4 includes a visual presentation unit, an auditory presentation unit, and a tactile presentation unit. The visual presentation unit presents notification information by stimulating the visual sense of an occupant. The visual presentation unit is at least one of, for example, a HUD (Head-up Display), an MFD (Multi Function Display), a combination meter, a navigation unit, a light emitting unit, and the like. The auditory presentation unit presents notification information by stimulating auditory sense of an occupant. The auditory presentation unit is, for example, at least one type of speaker, buzzer, vibration unit, and the like. The tactile presentation unit presents notification information by stimulating cutaneous sense of an occupant. The cutaneous sense stimulated by the tactile presentation unit includes at least one of tactile sense, temperature sense, wind sense, and the like. The tactile presentation unit is, for example, at least one of a steering wheel vibration unit, a driver's seat vibration unit, a steering wheel reaction force unit, an accelerator pedal reaction force unit, a brake pedal reaction force unit, and an air conditioning unit.

As shown in FIG. 6, the processing system 1 is connected to the sensor system 5, the communication system 6, the map DB 7, and the information presentation system 4 via at least one of a LAN (Local Area Network), a wire harness, an internal bus, a wireless communication line, and the like. The processing system 1 includes at least one dedicated computer. The dedicated computer that constitutes the processing system 1 may be an integrated ECU (Electronic Control Unit) that integrates driving controls of the host vehicle 2. The dedicated computer that constitutes the processing system 1 may be a determination ECU that is configured to determine the DDT for the driving control of the host vehicle 2. The dedicated computer that constitutes the processing system 1 may be a monitoring ECU that monitors the driving control of the host vehicle 2. The dedicated computer that constitutes the processing system 1 may be an evaluation ECU that evaluates the driving control of the host vehicle 2.

The dedicated computer that constitutes the processing system 1 may be a navigation ECU that navigates a travel route of the host vehicle 2. The dedicated computer that constitutes the processing system 1 may be a locator ECU that estimates a state quantity of the host vehicle 2, and the state quantity includes the position of the host vehicle 2. The dedicated computer that constitutes the processing system 1 may be an actuator ECU that controls motion actuators of the host vehicle 2. The dedicated computer that constitutes the processing system 1 may be an HCU (Human Machine Interface Control Unit, HMI Control Unit) that controls information presentation in the host vehicle 2. The dedicated computer that constitutes the processing system 1 may be at least one external computer that is included in an external center or a mobile terminal device, which is configured to perform communication via, for example, the communication system 6, with the host vehicle 2.

The dedicated computer of the processing system 1 has at least one memory 10 and at least one processor 12. The memory 10 is at least one type of non-transitory tangible storage medium, such as a semiconductor memory, a magnetic medium, and an optical medium, for storing, in non-transitory manner, computer readable programs and data. The processor 12 includes, as a core, at least one of, for example, a CPU (Central Processing Unit), a GPU (Graphics Processing Unit), an RISC (Reduced Instruction Set Computer) CPU, and the like.

The processor 12 executes multiple instructions included in a processing program stored in the memory 10 as software. Accordingly, the processing system 1 functions as multiple functional blocks to perform driving control process of the host vehicle 2. As described above, in the processing system 1, the functional blocks are implemented by the processor 12, which executes multiple instructions of processing programs stored in the memory 10 for performing the driving control process of the host vehicle 2. As shown in FIG. 8, the functional blocks implemented by the processing system 1 include a sensing block 100, a planning block 120, a risk supervising block 140, and a control block 160.

The sensing block 100 acquires sensor data from the external sensor 50 and the internal sensor 52 of the sensor system 5. The sensing block 100 acquires communication data from the communication system 6. The sensing block 100 acquires map data from the map DB 7. The sensing block 100 senses internal environment and external environment of the host vehicle 2 by fusing multiple types of acquired data as inputs. By detecting the internal environment and external environment, the sensing block 100 generates detection information to be transmitted to the planning block 120 and the risk supervising block 140 in a latter stage. When generating the detection information, the sensing block 100 acquires data from the sensor system 5 and the communication system 6, recognizes or comprehends the meaning of acquired data, determines situation of the host vehicle 2 in the external environment and in the internal environment, and determines general situation of the host vehicle 2 including the internal environment condition of the host vehicle 2 by integrating the acquired data. The sensing block 100 may provide substantially the same detection information to both the planning block 120 and the risk supervising block 140. The sensing block 100 may provide detection information to the planning block 120, and provides different detection information to the risk supervising block 140.

The detection information generated by the sensing block 100 describes a state of traveling environment of the host vehicle 2 detected for each scene. The sensing block 100 may detect objects, including road users, obstacles, and structures in the external environment of the host vehicle 2 to generate the detection information of the object. The detection information of object may represent at least one of, for example, a distance to the object, a relative velocity relative to the object, a relative acceleration relative to the object, and an estimated state based on tracking detection of the object. The detection information of object may further represent a type recognized or identified based on the state of detected object. The sensing block 100 may generate detection information of a travel route by detecting a travel route along which the host vehicle 2 is currently traveling and plans to travel in future. The detection information of travel route may represent, for example, at least one of states among a road surface, a lane, a roadside, a free space, and the like.

The sensing block 100 may generate detection information of a self-state quantity including position information of the host vehicle 2 by localization to presumptively detect the self-state quantity. The sensing block 100 may generate update information of the map data regarding the travel route of the host vehicle 2 at the same time as generating the detection information of the self-state quantity, and provide the update information to the map DB 7 as feedback. The sensing block 100 may detect a mark associated with the travel route of the host vehicle 2 to generate the detection information of mark. The detection information of mark may represent at least one of, for example, a traffic sign, a lane marking, a traffic light, or the like. The detection information of mark may also represent a traffic rule that is recognized or identified from the state of traffic sign. The sensing block 100 may generate the detection information of weather condition by detecting the weather condition for each scene in which the host vehicle 2 is traveling. The sensing block 100 may generate the detection information of time by detecting a time for each driving scene of the host vehicle 2.

The planning block 120 acquires the detection information from the sensing block 100. The planning block 120 plans driving control of the host vehicle 2 according to the acquired detection information. In the driving control planning, control commands related to the navigation operation and driver assistance operation of the host vehicle 2 are generated. That is, the planning block 120 implements DDT function that generates a control command as a motion control request for host vehicle 2. The control command generated by the planning block 120 may include control parameters for controlling motion actuators of the host vehicle 2. The motion actuators to which control commands are output include, for example, at least one of an internal combustion engine, an electric motor, a power train in which the internal combustion engine is combined with the motor, a braking device, a steering device, and the like.

The planning block 120 may use a safety model, which is described according to a driving policy and safety of driving policy, to generate the control commands in compliance with the driving policy. The driving policy, according to which the safety model is generated, may be defined, for example, based on a vehicle level safety strategy that guarantees Safety Of The Intended Functionality (hereinafter, referred to as SOTIF). The safety model is described to follow the driving policy that implements the vehicle level safety strategy, and is generated by modeling the SOTIF. The planning block 120 may perform training on the safety model with a machine learning algorithm that performs back-propagations of driving control results to the safety model. As the safety model to be trained, at least one type of a learning model may be used among deep learning by a neural network such as DNN (Deep Neural Network), reinforcement learning, and the like. The safety model may be defined as safety-related models that express safety-related aspects of driving behaviors based on an assumption about reasonably foreseeable behaviors of other road users. Alternatively, the safety model may be defined as a model configuring a part of the safety-related models. Such a safety model may be configured in at least one form of, for example, a mathematical model that formulates vehicle level safety or a computer program that executes processes according to the mathematical model.

The planning block 120 may make a plan for a future route along which the host vehicle 2 plans to travel with the driving control prior to generating the control commands. The path planning may be performed computationally, for example, by simulation to navigate the host vehicle 2 based on the detection information. That is, the planning block 120 may implement DDT function to plan a route as a strategic action of the host vehicle 2. The planning block 120 may also plan a proper trajectory based on the acquired detection information for the host vehicle 2, which travels along the planned route, prior to generating the control commands. That is, the planning block 120 may implement DDT function to plan a trajectory for the host vehicle 2. The trajectory planned by the planning block 120 may define chronologically at least one of a traveling position, a speed, an acceleration, and a yaw rate as a kinetic physical quantity relating to the host vehicle 2. The chronological trajectory plan builds a scenario of future travel for the host vehicle 2 by navigation. The planning block 120 may generate the trajectory based on a plan using the safety model. In this case, the safety model may be trained by a machine learning algorithm based on computation results by computing a cost function that assigns a cost to the generated trajectory.

The planning block 120 may make a plan for adjusting the levels of driving automation for the host vehicle 2 according to the acquired detection information. Adjusting the levels of driving automation may include takeover between automated driving and manual driving. By setting Operational Design Domain (hereinafter, referred to as ODD) where the automated driving is executed, the takeover between automated driving and manual driving is implemented in an entering scenario to ODD or exiting scenario from ODD. The exiting scenario from the ODD, that is, the takeover scenario from automated driving to manual driving includes, as a use case, an unreasonable situation in which an unreasonable risk is determined to exist based on, for example, the safety model. In this use case, the planning block 120 may plan a DDT fallback for the driver who is a fallback ready user to perform a minimum risk maneuver to the host vehicle 2 to control the host vehicle 2 to shift to a minimum risk condition.

Adjusting the levels of driving automation may include a degraded traveling of the host vehicle 2. The degraded traveling scenario includes, as a use case, an unreasonable situation in which an unreasonable risk is determined to exist due to takeover to the manual driving based on, for example, the safety model. In this use case, the planning block 120 may plan DDT fallback to control the host vehicle 2 to shift to a minimum risk condition by performing autonomous driving or autonomous stop. The DDT fallback for controlling the host vehicle 2 to shift to the minimum risk condition is not only implemented by adjusting the levels of driving automation, but also adjusting such as MRM (Minimum Risk Maneuver) or the like to perform a degraded traveling while maintaining the levels of driving automation. The DDT fallback for controlling the host vehicle 2 to shift to the minimum risk condition may enhance the prominence of the shift situation by at least one of, for example, lighting, horns, signals, and gestures.

The risk supervising block 140 acquires the detection information from the sensing block 100. The risk supervising block 140 monitors a risk between the host vehicle 2 and a target moving object 3 (see FIG. 7) for each scene based on the acquired detection information. The risk supervising block 140 chronologically performs risk monitoring based on the detection information so as to guarantee the SOTIF of the host vehicle 2 with respect to the target moving object 3. The target moving object 3 assumed in the risk monitoring is other road users existing in the traveling environment of the host vehicle 2. The target moving object 3 includes non vulnerable road users such as automobiles, trucks, motorbikes, and bicycles, and vulnerable road users such as pedestrians. The target moving object 3 may further include an animal.

The risk supervising block 140 sets, based on the acquired detection information acquired for each scene, a safety envelope that ensures SOTIF of the host vehicle 2 based on, for example, a vehicle level safety strategy. The risk supervising block 140 may set the safety envelope between the host vehicle 2 and the target moving object 3 using the safety model, which conforms to the driving policy as described above. The safety model used to set the safety envelope may be designed to avoid, in accordance with accident liability rules, potential accident liability resulting from an unreasonable risk or road user misuse. In other words, the safety model may be designed such that the host vehicle 2 complies with the accident liability rules, which is compliant with the driving policy. Such a safety model includes, for example, a Responsibility Sensitive Safety model as disclosed in JP 6708793 B2.

The safety envelope may be defined as a set of limitations and conditions under which the system is designed to act as a target of a constraint/restriction or control to maintain operation within an acceptable level of risk. Such a safety envelope may be defined as a physical-based margin around each road user including the host vehicle 2 and the target moving object 3. The safety envelope may be set with a margin relating to at least one physical quantity such as a distance, velocity, or acceleration. For example, in setting the safety envelope, a safety distance may be assumed from a profile relating to at least one kinematic quantity, based on the safety model for the host vehicle 2 and the target moving object 3 that are assumed to comply with the driving policy. The safety distance defines boundary ensuring a physical-based margin around the host vehicle 2 for the expected motion of the target moving object 3. The safety distance may be assumed in view of the response time until a proper response is taken by the road user. The safety distance may be assumed to comply with accident liability regulations. For example, in a scene where a lane structure such as lanes exist, a safety distance in the longitudinal direction of the host vehicle 2 for avoiding the risk of rear-end collision and head-on collision and a safety distance in the lateral direction of the host vehicle 2 for avoiding the risk of side collision may be calculated. In a scene where no lane structure exists, a safety distance to avoid the risk of collision of trajectory of the host vehicle 2 in any direction may be calculated.

The risk supervising block 140 may identify a scene-by-scene situation of relative motion between the host vehicle 2 and the target moving object 3 prior to setting the safety envelope as described above. For example, in a scene where a lane structure such as lanes exist, a situation where the risk of rear-end collision and head-on collision is assumed in the longitudinal direction or a situation where the risk of side collision is assumed in the lateral direction may be identified. In identifying these longitudinal and lateral situations, the state quantity relating to the host vehicle 2 and the target moving object 3 may be transformed into a coordinate system that assumes a lane structure with straight lanes. In a scene where no lane structure exists, a situation where a risk of collision of trajectory in a direction of the host vehicle 2 may be identified. For the above-described situation identification function, the situation identification result may be given to the risk supervising block 140 as the detection information by executing at least part of the situation identification function using the sensing block 100.

The risk supervising block 140 executes a safety evaluation between the host vehicle 2 and the target moving object 3 based on the set safety envelope and the acquired detection information for each scene. That is, the risk supervising block 140 tests whether the driving scene interpreted based on the detection information between the host vehicle 2 and the target moving object 3 causes a safety envelope violation that is a violation of the safety envelope, thereby implementing the safety evaluation. When a safety distance is assumed in setting the safety envelope, no occurrence of violation of the safety envelope may be determined when the actual distance between the host vehicle 2 and the target moving object 3 exceeds the safety distance. When the actual distance between the host vehicle 2 and the target moving object 3 is reduced to be equal to or less than the safety distance, the safety envelope may be determined to be violated.

The risk supervising block 140 may calculate a reasonable scenario through simulation to provide the host vehicle 2 with a proper action to be taken in response to a determination that the safety envelope has been violated as a proper response. In the reasonable scenario simulation, by estimating a state transition between the host vehicle 2 and the target moving object 3, an action to be taken for each transition state is set as a constraint/restriction (which will be described later) on the host vehicle 2. In setting the action, a constraint/restriction value assumed for a kinetic physical quantity may be calculated so as to limit, as a constraint/restriction on the host vehicle 2, at least one type of the kinetic physical quantity given to the host vehicle 2.

Based on the safety model for the host vehicle 2 and the target moving object 3 that are assumed to comply with the driving policy, the risk supervising block 140 may directly calculate the constraint/restriction value to comply with the accident liability rules from the profile relating to at least one type of the physical quantity. It may be said that the direct calculation of the constraint/restriction value is setting of the safety envelope, and also the direct calculation of the constraint/restriction value is setting of constraint/restriction on the driving control. Therefore, when an actual value that is safer than the constraint/restriction value is detected, the safety envelope may be determined to be not violated. On the other hand, when an actual value beyond the constraint/restriction value is detected, the safety envelope may be determined to be violated.

The risk supervising block 140 may store, in the memory 10, at least one type of evidence information such as detection information used to set the safety envelope, determination information indicative of the determination result of the safety envelope, detection information having an effect on the determination result, and simulated scenarios. The memory 10 that stores the evidence information may be installed inside the host vehicle 2 or installed at an external center outside of the host vehicle 2 according to the type of the dedicated computer that constitutes the processing system 1. The evidence information may be stored in unencrypted, encrypted or hashed state. The evidence information may be stored at least when the safety envelope is determined to be violated. The evidence information may be stored even when the safety envelope is determined to be not violated. The evidence information when no violation of the safety envelope is determined can be used as a lagging measure at the time of storing and also be used as a leading measure in future.

The control block 160 acquires a control command from the planning block 120. The control block 160 acquires the determination information on the safety envelope from the risk supervising block 140. That is, the control block 160 implements a DDT function that controls the motion of the host vehicle 2. The control block 160 executes the planned driving control of the host vehicle 2 in accordance with the control command when the control block 160 acquires the determination information indicating that the safety envelope is not violated.

When the control block 160 acquires the determination information indicating that the safety envelope is violated, the control block 160 imposes a constraint/restriction on the planned driving control of the host vehicle 2 according to the driving policy based on the determination information. The constraint/restriction on the driving control may be functional restrictions. The constraint/restriction on the driving control may be degraded constraints. The constraint/restriction on the driving control may be a different constraint/restriction from the above-described constraints/restriction. The constraint/restriction on the driving control may be implemented by constraining/restricting the control command. When a reasonable scenario is simulated by the risk supervising block 140, the control block 160 may constrain/restrict the control command according to that scenario. At this time, when a constraint/restriction value is set for the kinetic physical quantity of the host vehicle 2, the control parameter of the motion actuator included in the control command may be corrected based on the constraint/restriction value.

The following will describe a first embodiment of the present disclosure.

Figure 9:
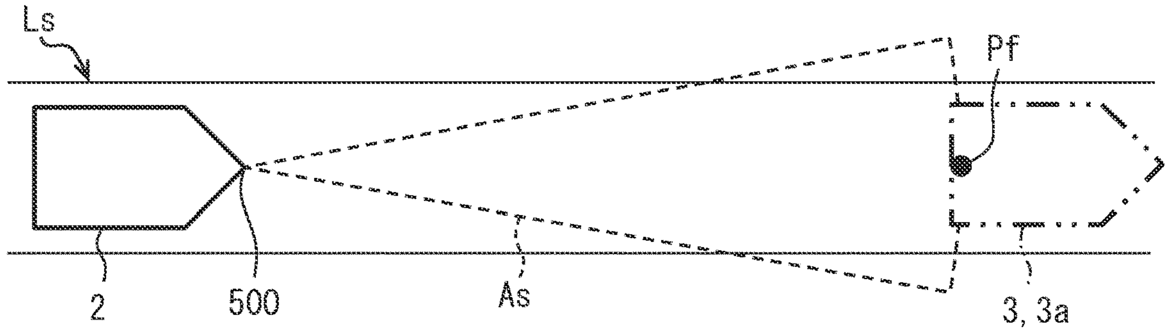
FIG. 9 is a schematic diagram showing sensing under a lane structure according to the first embodiment.
Figure 10:
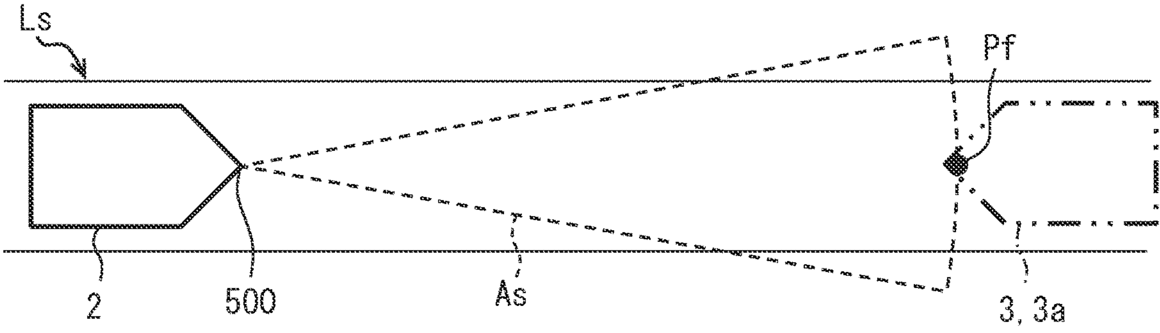
FIG. 10 is a schematic diagram showing sensing under a lane structure according to the first embodiment.
Figure 11:
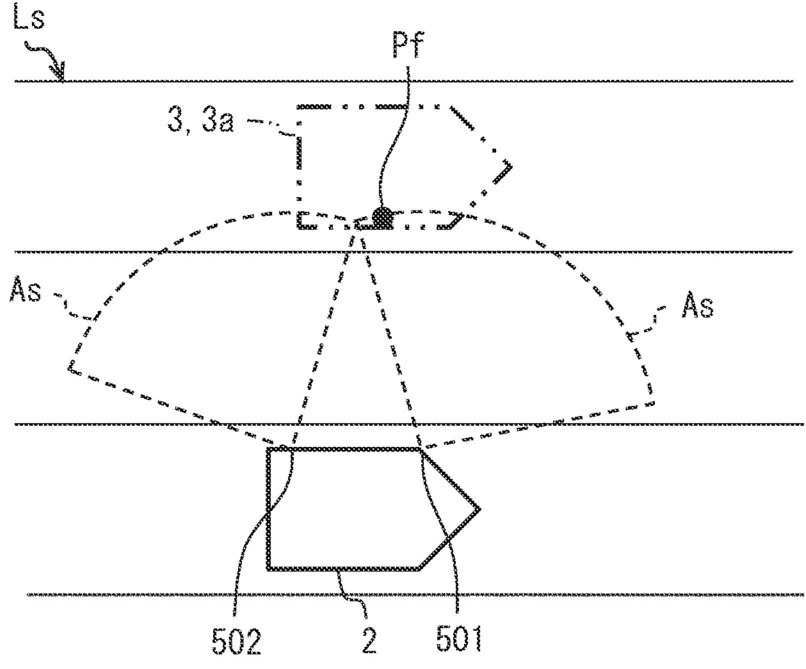
FIG. 11 is a schematic diagram showing sensing under a lane structure according to the first embodiment.

As shown in FIG. 9 to FIG. 11, the first embodiment assumes a lane structure Ls with a separated lane. The lane structure Ls with a direction in which the lane extends as the longitudinal direction imposes a constraint/restriction on the motion of the host vehicle 2 and the target moving object 3. The lane structure Ls with a width direction of the lane or a direction in which the lanes are arranged as the lateral direction imposes a constraint/restriction on the motion of the host vehicle 2 and the target moving object 3.

When the target moving object 3 is a target vehicle 3*a*, the driving policy between the host vehicle 2 and the target moving object 3 in the lane structure Ls is defined by the following (A) to (E), for example. It should be noted that a forward direction with respect to the host vehicle 2 is, for example, a traveling direction on a turning circle at the current steering angle of the host vehicle 2, a traveling direction of a straight line that passes through the center of gravity of the host vehicle 2 and is perpendicular to the axle of the host vehicle 2, or a traveling direction along an axial line of the FOE (Focus of Expansion) of the camera from the front camera module in the sensor system 5 of the host vehicle 2.

(A) The vehicle will not collide with a preceding vehicle from behind.

(B) The vehicle will not forcibly cut in between other vehicles.

(C) Even if the vehicle has priority, the vehicle will give way to other vehicles depending on the situation.

(D) The vehicle cautiously travels in a place with poor visibility.

(E) Regardless of whether the vehicle has a responsibility or not, if it is possible for the vehicle to avoid an accident by itself, the vehicle will take a reasonable action to avoid it.

In the safety model that is in compliance with the driving policy and is generated by modeling SOTIF, the action of the road user which does not lead to an unreasonable situation is assumed to be a reasonable action that is required to be taken by the road user. The unreasonable situation between the host vehicle 2 and the target moving object 3 in the lane structure Ls is a head-on collision, a rear-end collision, and a side collision. When the target moving object 3 for the host vehicle 2 is a target vehicle 3*a*, the reasonable action in a head-on collision situation includes, for example, applying brakes to the vehicle traveling in the opposite direction. When the target moving object 3 for the host vehicle 2 is a target vehicle 3*a*, the reasonable action in a rear-end collision situation includes, for example, not applying sudden brakes with a certain level or more brake amount in the preceding vehicle and avoiding the rear-end collision by the preceding vehicle on the premise that the preceding vehicle does not make a sudden deceleration. When the target moving object 3 for the host vehicle 2 is a target vehicle 3*a*, the reasonable action in a side collision situation includes, for example, steering each of the vehicles traveling side by side in a direction away from one another. When assuming the reasonable action, the state quantities related to the host vehicle 2 and the target moving object 3 are converted into, regardless of whether the lane structure Ls has a curved lane or the lane structure Ls has an undulating lane, a Cartesian coordinate system defining the longitudinal direction and the lateral direction assuming a linear and planar lane structure Ls.

The safety model may be designed according to accident liability rules which assume that a moving object that does not take a reasonable action would be responsible for the accident. In the safety model used to monitor the risk between the host vehicle 2 and the target moving object 3 under the accident liability rule in the lane structure Ls, a safety envelope is set for the host vehicle 2 so as to avoid a potential accident liability by taking a reasonable action. When the processing system 1 is operating in a normal situation, the risk supervising block 140 determines whether violation of the safety envelope occurs by comparing an actual distance between the host vehicle 2 and the target moving object 3 with the safety distance that is set based on the safety model for each driving scene. When the safety envelope is determined to be violated, the risk monitoring block 140 in a normal situation simulates a scenario for giving a reasonable action to the host vehicle 2. Based on the simulation, the risk supervising block 140 sets, as a constraint/restriction on the driving control performed by the control block 160, a constraint/restriction value regarding at least one of speed or acceleration, for example. In the following description, the violation determination function and the constraint/restriction setting function in a normal situation are referred to as a normal safety function.

Figure 12:
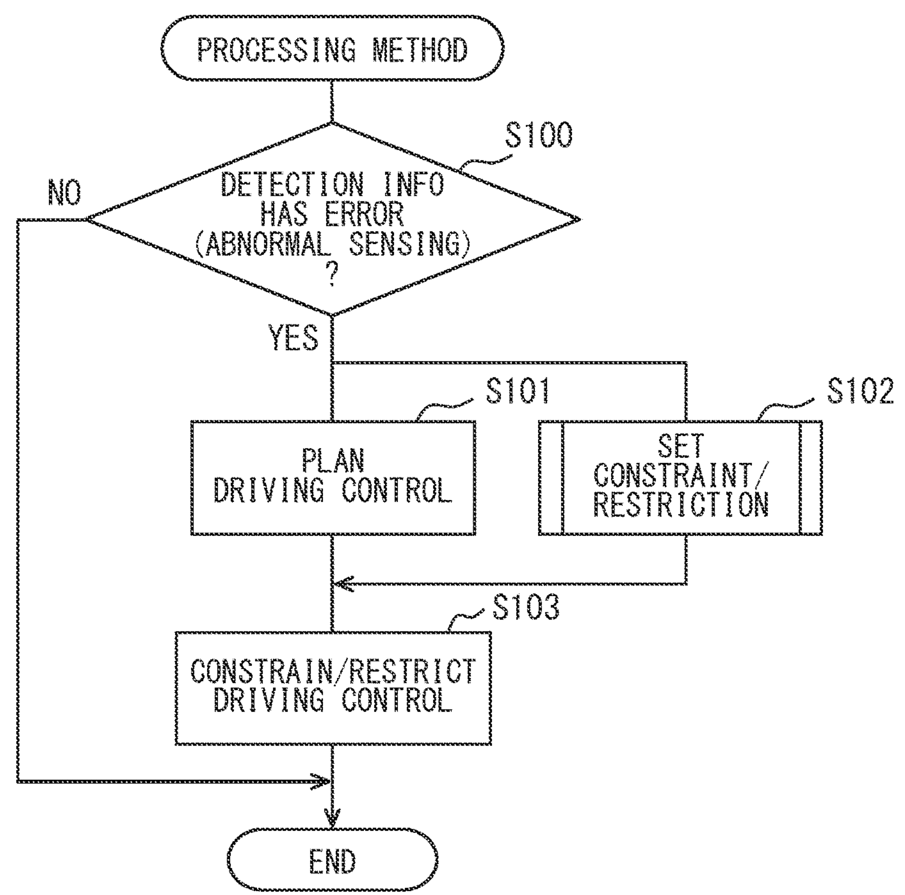
FIG. 12 is a flowchart showing a processing method according to the first embodiment.

When the detection information detected by the sensing block 100 has an abnormality as a situation of the processing system 1 is abnormal, a processing method of performing the driving control processing according to the flowchart illustrated in FIG. 12 is executed by cooperation of the blocks 100, 120, 140, and 160. This process is repeated in a regular cycle. In the following description, each "S" in the processing method indicates each step executed by each instruction included in a processing program.

In S100 of the processing method, the sensing block 100 monitors the abnormality of the detection information in time series for each control cycle. The abnormality in the first embodiment includes a sensing abnormality of the sensor system 5 mounted on the host vehicle 2. The sensor system functions as a generation source of the detection information. Examples of the sensing abnormality include an abnormality in which the detection information itself cannot be generated or an abnormality in which the accuracy or reliability of the detection information decreases due to at least one factors. The factors may include an abnormality in the external sensor 50 of the sensor system 5, a disturbance including a weather influence on the external sensor 50 of the sensor system 5, or a detection limit including a blind spot of the external sensor 50 of the sensor system 5.

As shown in FIG. 9 and FIG. 10, the external sensor 50 of the first embodiment includes a single longitudinal sensor 500 in which a detection range As is set with respect to the longitudinal direction of the host vehicle 2. As illustrated in FIG. 11, the external sensor 50 of the first embodiment also includes multiple lateral direction sensors 501, 502 which have mutually adjacent detection ranges As. The adjacent detection ranges are respectively set by the multiple sensors to have substantially the same size in the lateral direction of the host vehicle 2. Therefore, in S100, the sensing block 100 determines that an abnormality has occurred in the detection information when a sensing abnormality is confirmed in the detection range As of any one of the longitudinal sensor 500 and the lateral sensor 501, 502.

When the sensing block 100 determines that an abnormality of the detection information has occurred due to the sensing abnormality in S100, the processing method proceeds to S101 and S102 in parallel. When the sensing block 100 determines that no abnormality has occurred in the normal detection information, the current flow of the processing method ends. In response to the abnormality being occurred in the detection information in S100, scene information regarding a traveling scene at the time of occurrence of the abnormality may be stored in the memory 10. In this case, as the scene information, for example, among abnormality content of the detection information, a set range of the safety envelope, violation content of the safety envelope, information of a virtual moving object (described later), a setting result of the constraint/restriction, presence or absence of degradation, driving control result, time stamp of specific date and time as a start point, current date and time, at least the abnormality content of the detection information may be stored or at least two types of the information may be stored in association with one other. When the abnormality being determined to be occurred in S100, the scene information regarding a traveling scene at the time of abnormality occurrence may be presented to the occupant through the information presentation system 4. In this case, as the scene information, for example, among abnormality content of the detection information, a set range of the safety envelope, violation content of the safety envelope, information of a virtual moving object (described later), a setting result of the constraint/restriction, presence or absence of degradation, driving control result, time stamp of specific date and time as a start point, current date and time, at least the abnormality content of the detection information may be presented or at least two types of the information may be presented in association with one other. The monitoring and determination at S100 may be performed by at least one of the planning block 120 and the risk supervising block 140.

Figure 13:
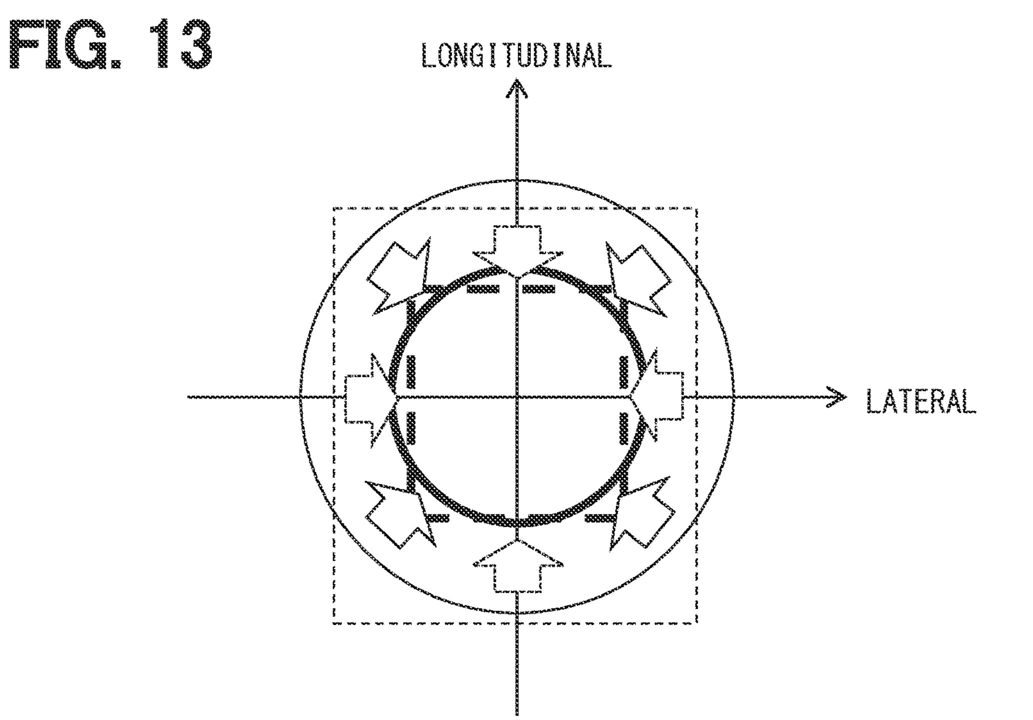
FIG. 13 is a schematic diagram showing a concept of a safety envelope according to the first embodiment.

In S101 of the processing method, the planning block 120 plans the driving control for executing the degraded traveling or the takeover to the manual driving for each control cycle in time series, as the adjustment of levels of driving automation in the host vehicle 2. In the concept of the safety envelope, FIG. 13 schematically illustrates that the driving control commanded to the control block 160 is degraded at the occurrence time of abnormality indicated by a thick dashed line rather than at the normal time indicated by a thin dashed line. That is, it can be said that the planning block 120 plans, in S101, the degradation of driving control. In S101, the planning block 120 may plan to continue the driving control with best effort without degrading the driving control to be instructed to the control block 160.

Figure 14:
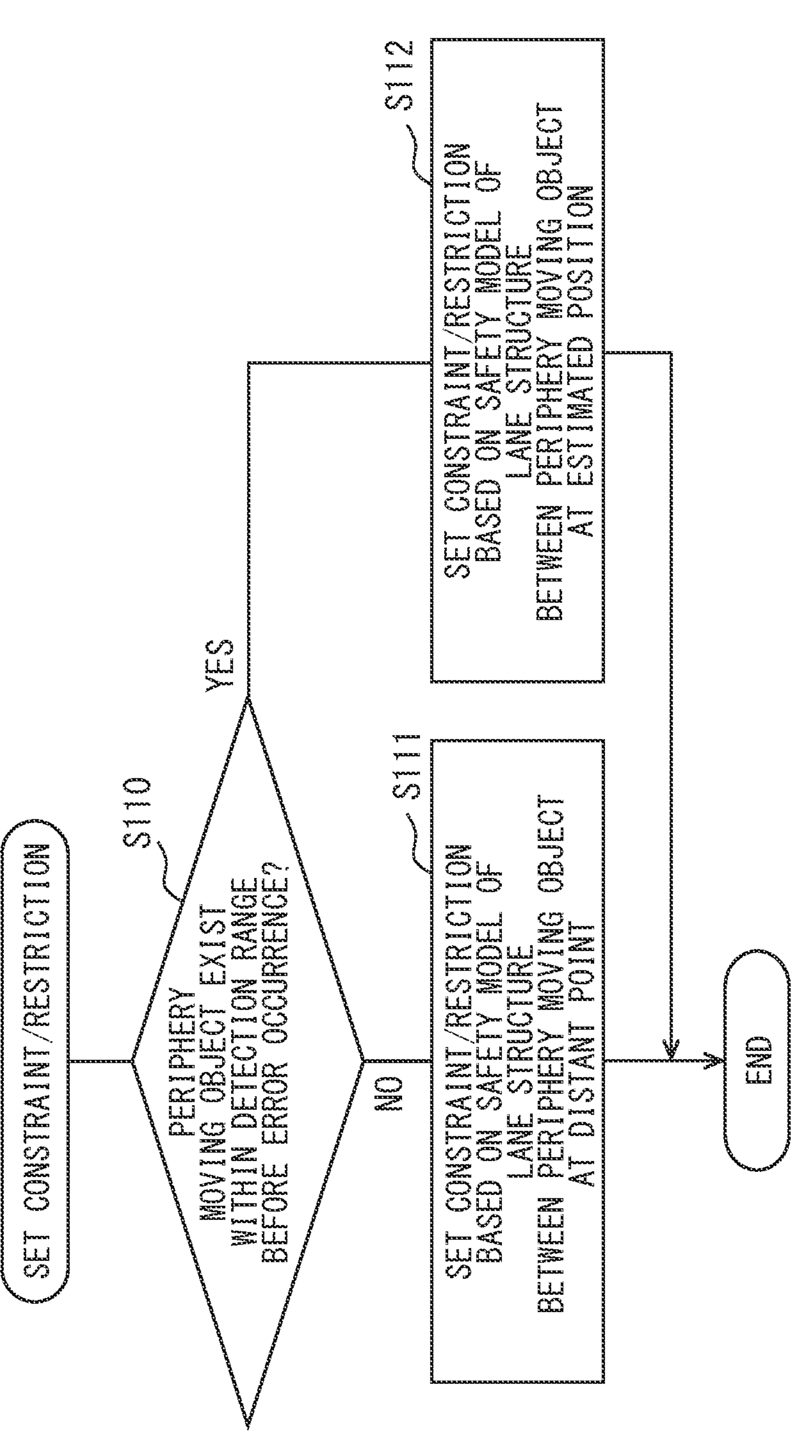
FIG. 14 is a flowchart showing a restriction or constraint setting subroutine according to the first embodiment.

In S102 of the processing method, the risk supervising block 140 sets the constraint/restriction to be applied to the driving control planned in S101 for each control cycle in time series based on the safety model of the lane structure Ls. By executing a subroutine shown in FIG. 14, the constraint/restriction setting function at the occurrence time of abnormality can further degrade the constraint/restriction on the driving control compared with the normal time safety function. The constraint/restriction setting subroutine may be started simultaneously with the start of degradation of driving control in S101. The constraint/restriction setting subroutine may be started after waiting for a predetermined control cycle of the driving control from the start of degradation of driving control in S101. The constraint/restriction setting subroutine may be started earlier by a predetermined control cycle than the start of degradation of driving control in S101.

In S110 of the constraint/restriction setting subroutine, the risk supervising block 140 determines whether a target moving object 3 is present in a detection range As of abnormality occurrence target in a traveling scene before occurrence of abnormality. When the risk supervising block 140 determines that a target moving object 3 is not present in the detection range As, the constraint/restriction setting subroutine proceeds to S111. When the risk supervising block 140 determines that a target moving object 3 is present in the detection range As, the constraint/restriction setting subroutine proceeds to S112.

In S111 of the constraint/restriction setting subroutine, as shown in FIG. 9 to FIG. 11, the risk supervising block 140 virtually sets the target moving object 3 at a distant point Pf located at a detection limit distance within the detection range As of the abnormality occurrence target. That is, the position of target moving object 3 serving as the virtual moving object is assumed to be the distant point Pf located at the detection limit distance. The distant point Pf is defined at a location at a detection limit distance which is the longest distance in the longitudinal direction or the lateral direction of the detection range As. In S111, a speed limit value in the longitudinal direction or in the lateral direction according to the detection range As of the abnormality occurrence target is set as the constraint/restriction on the driving control of the host vehicle 2 based on the safety model of the lane structure Ls between the target moving object 3 at the distant point Pf and the host vehicle 2. The constraint/restriction and the safety model used for setting the constraint/restriction are assumed by at least one of, for example, model switching, parameter adjustment, and the like in accordance with the scene of abnormality occurrence. At this time, the safety model related to the lane structure Ls is assumed for the type of target moving object 3, which is recognized or estimated from the detection information before the occurrence of abnormality.

Figure 15:
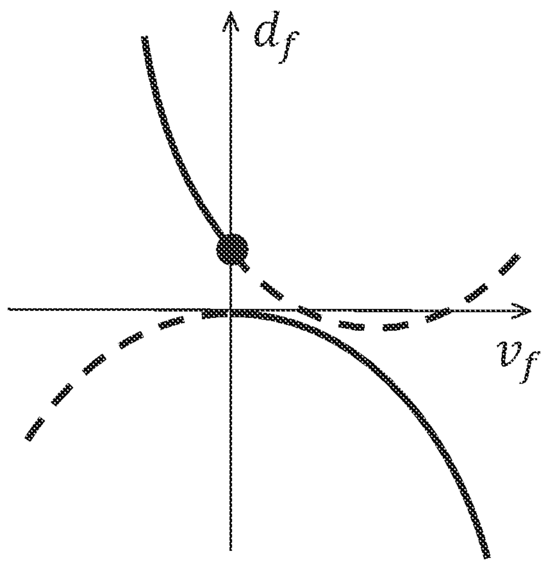
FIG. 15 is a graph showing a safety model according to the first embodiment.

The upper limit speed $v_{r,max}$, which is the speed limit value assumed in the longitudinal direction, is calculated by the following equations 1 and 2 as a speed at which the host vehicle 2 can safely stop within the detection limit distance $d_s$ from the longitudinal sensor 500 to the distant point Pf as shown in FIG. 9 and FIG. 10. Equations 1 and 2 are functional equations related to the acceleration/deceleration profile defined based on the safety model shown in FIG. 15. In equations 1 and 2, $d_f$ is a distance by which the target moving object 3 stops in the longitudinal direction according to the acceleration/deceleration profile based on the safety model. $a_r$ is the maximum acceleration of the host vehicle 2 in the longitudinal direction. $b_r$ is the minimum deceleration of the host vehicle 2 in the longitudinal direction. $a_f$ is the maximum acceleration of the target moving object 3 in the longitudinal direction. $b_{f,min}$ is the minimum deceleration of the target moving object 3. $b_{f,max}$ is the maximum deceleration of the target moving object 3 in the longitudinal direction. ρ is the response time of the host vehicle 2 and the target moving object 3. $v_f$ is the speed of the target moving object 3 in the longitudinal direction.

$$v_{r,max} = \sqrt{b_r\left(2d_s - d_f + b_r\rho^2 + a_r\rho^2\right)} - (a_r + b_r)\rho \qquad \text{(Equation 1)}$$

$$d_f = \begin{cases} -\dfrac{v_f}{2b_{f,max}}, & \text{for } v_f > 0 \\ \dfrac{(v_f - (a_f + b_{f,min})\rho)^2}{2b_{f,min}} - \dfrac{a_f + b_{f,min}}{2}\rho^2, & \text{for } v_f \le 0 \end{cases} \qquad \text{(Equation 2)}$$

As illustrated in FIG. 10, in a scene where a risk of head-on collision is assumed, the speed $v_f$ may be set to the maximum speed assumed for the target moving object 3 based on, for example, the legal speed. On the other hand, as illustrated in FIG. 9, in a scene where a risk of rear-end collision is assumed or in a scene where only the target moving object 3 is responsible for an accident even in a head-on collision, the speed $v_f$ may be set to zero (0). The scene where only the target moving object 3 is responsible for an accident even in a head-on collision may include a traveling scene where the lane structure Ls is one-way structure, or the lane structure Ls has a median strip or the like In a scene where risks of both a head-on collision and a rear-end collision are assumed, the speed $v_f$ may be set to a maximum speed of head-on collision in which a safety distance assumed by the safety model in the normal safety function is long.

When the risk of head-on collision is assumed, the safety speed for avoiding the risk of head-on collision as the safety envelope is lower than the safety speed for avoiding the risk of rear-end collision. Therefore, the speed $v_f$ of the target moving object 3 in the longitudinal direction may be set to a speed assumed based on at least one of the road width, the traveling data of the host vehicle 2 and the target moving object 3 in the past, the current speed of the surrounding environment, in a first scene where the maximum speed is not regulated although the risk of head-on collision is assumed. The speed assumed at this time may be initially set based on data obtained by a demonstration experiment and then updated based on data obtained by a market environment. On the other hand, in a second scene where the maximum speed is regulated when the risk of head-on collision is assumed, the speed of may be set to the maximum speed.

For example, in a case where the risk of head-on collision is not assumed on a motorway, a road separated by a median strip, a one-way road, or the like, only the risk of rear-end collision may be assumed. Therefore, the speed if of the target moving object 3 in the longitudinal direction may be set to zero (0) in a third scene where the minimum speed is not regulated since the risk of head-on collision is not assumed. On the other hand, the speed $v_f$ may be set to the minimum speed in a fourth scene where the minimum speed is regulated when the risk of head-on collision is not assumed.

By such setting for each scene, the safety distance in the longitudinal direction as the safety envelope becomes shorter in the order of the first, second, third, and fourth scenes. At the same time, the upper limit speed $v_{r,max}$ of the host vehicle 2 in the longitudinal direction increases in the order of the first, second, third, and fourth scenes.

Figure 16:
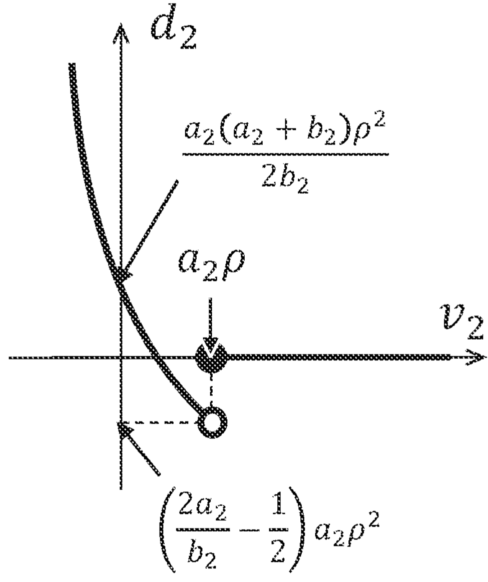
FIG. 16 is a graph showing a safety model according to the first embodiment.

The upper limit speed $v_{1,max}$, which is the speed limit value assumed in the lateral direction, is calculated by the following equations 3 and 4 as a speed at which the host vehicle 2 can safely stop within the detection distance $d_s$ from one of a first lateral sensor 501 or a second lateral sensor 502 to the distant point Pf as shown in FIG. 11. Equations 3 and 4 are functional equations related to the acceleration/deceleration profile defined based on the safety model shown in FIG. 16. In equations 3 and 4, $d_2$ is a distance by which the target moving object 3 stops in the lateral direction according to the acceleration/deceleration profile based on the safety model. $a_1$ is the maximum acceleration of the host vehicle 2 in the lateral direction. $b_1$ is the minimum deceleration of the host vehicle 2 in the lateral direction. $a_2$ is the maximum acceleration of the target moving object 3 in the lateral direction. $b_2$ is the minimum deceleration of the target moving object 3 in the lateral direction. $\rho$ is the response time of the host vehicle 2 and the target moving object 3. $v_1$ is the velocity of the host vehicle 2 in the lateral direction. $v_2$ is the velocity of the target moving object 3 in the lateral direction.

(Equation 3)

$$v_{1,max} = \begin{cases} \sqrt{b_1(2d_S - d_2 + b_1\rho^2 + a_1\rho^2)} - (a_1 + b_1)\rho, & \text{for } v_1 + a_1\rho > 0 \\ \infty, & \text{for } v_1 + a_1\rho \le 0 \end{cases}$$

(Equation 4)

$$d_2 = \begin{cases} \frac{(v_2 - (a_2 + b_2)\rho)^2}{2b_2} - \frac{a_2 + b_2}{2}\rho^2, & \text{for } v_2 - a_2\rho < 0 \\ 0, & \text{for } v_2 - a_2\rho \ge 0 \end{cases}$$

In a scene where a risk of side collision is assumed, the speed $v_2$ may be set to the maximum speed assumed for the target moving object 3 based on, for example, the legal speed. The maximum speed of target moving object 3 may be assumed to be a speed based on at least one of a road width, past traveling data of the host vehicle 2 and the target moving object 3, a current speed of the surrounding environment, and the like. The maximum speed assumed at this time may be initially set based on data obtained by a demonstration experiment and then updated based on data obtained by a market environment.

In the concept of the safety envelope, FIG. 13 schematically illustrates that the constraint/restriction imposed on degraded driving control is further degraded at the occurrence time of abnormality as indicated by a thick solid line, compared with the normal time indicated by a thin solid line. Therefore, in S111, the risk supervising block 140 may determine a violation of the safety envelope based on the upper limit speed $v_{r,max}$ or the upper limit speed $v_{1,max}$ serving as the constraint/restriction. At this time, when the host vehicle 2 exceeds the upper limit speed $v_{r,max}$ or exceeds the upper limit speed $v_{1,max}$, violation of the safety envelope may be determined.

Figure 17:
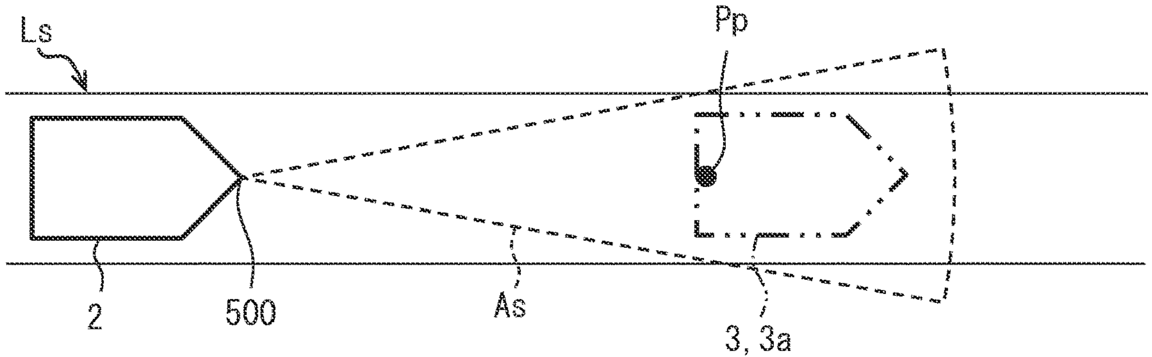
FIG. 17 is a schematic diagram showing sensing under a lane structure according to the first embodiment.
Figure 18:
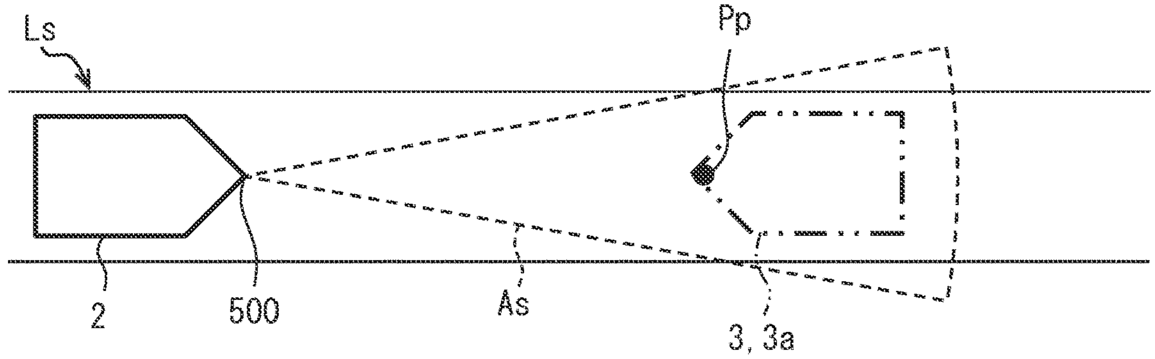
FIG. 18 is a schematic diagram showing sensing under a lane structure according to the first embodiment.
Figure 19:
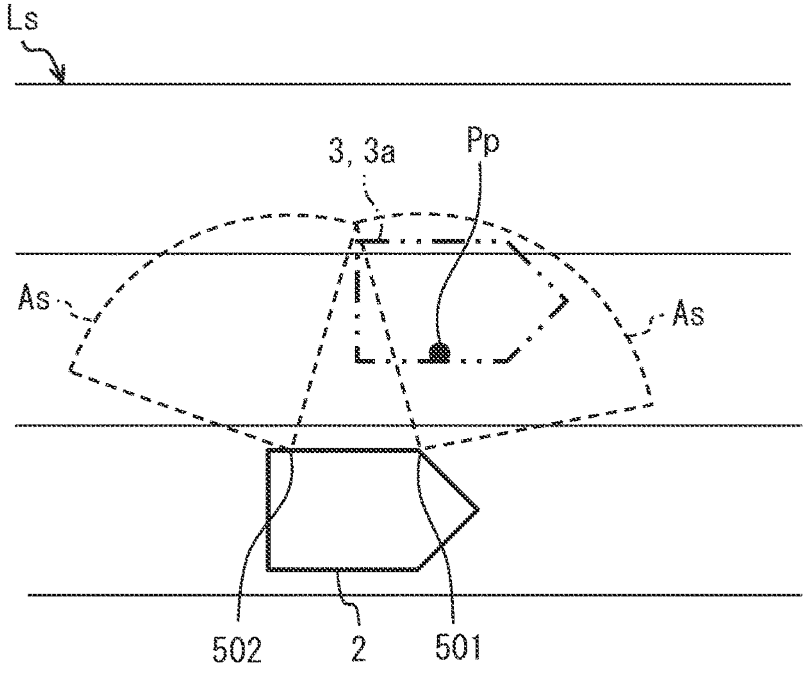
FIG. 19 is a schematic diagram showing sensing under a lane structure according to the first embodiment.

In S112 of the constraint/restriction setting subroutine, as illustrated in FIG. 17 to FIG. 19, the risk supervising block 140 virtually sets the target moving object 3 at an estimated position Pp estimated based on the position of the target moving object 3 before the occurrence of abnormality. The position of target moving object 3 serving as the virtual moving object is assumed to be the estimated position Pp. The estimated position Pp may be assumed to be a position where the target moving object 3 is present in the traveling scene before the occurrence of abnormality in the detection range As of abnormality occurrence target. The estimated position Pp may be calculated from the speed and the elapsed time at the position where the target moving object 3 is present in the traveling scene before the occurrence of abnormality in the detection range As of abnormality occurrence target. The estimated position Pp may be set to one of the assumed position or the calculated position, which has a higher risk. For these reasons, in S112, the constraint/restriction on the driving control of the host vehicle 2 is set based on the safety model of the lane structure Ls as in S111 except that the distant point Pf is replaced with the estimated position Pp. In S112, violation of the safety envelope may be determined similar to S111.

As shown in FIG. 12, the processing method proceeds from S101 and S102 to S103, which is in common. In S103, the control block 160 applies the constraint/restriction, which is set by the risk supervising block 140 in S111 or S112 of the constraint/restriction setting subroutine of S102, to the driving control planned in S101. By limiting the constrained/restricted speed of the host vehicle 2 to equal to or lower than the upper limit speed $v_{r,max}$ or the upper limit speed $v_{1,max}$, it is possible to avoid violation of the safety envelope. After the execution of S103, the current flow of the processing method ends.

In the known technology as described above, it may be difficult set a proper constraint/restriction on the driving control when an abnormality occurs in detection information due to, for example, a failure, a disturbance, a detection limit, or the like of the sensor system, which corresponds to a generation source of detection information. According to the first embodiment, when an abnormality is occurred in the monitored detection information, the constraint or restriction according to the detection information is set to the driving control based on the safety model, which is in compliance with the driving policy and is generated by modeling SOTIF. According to the above configuration, it is possible to secure the accuracy of driving control by properly setting the constraint or restriction in a scene where the abnormality is occurred in the detection information, specifically in a scene where sensing abnormality is occurred as described in the first embodiment.

Second Embodiment

A second embodiment is a modification of the first embodiment.

Figure 20:
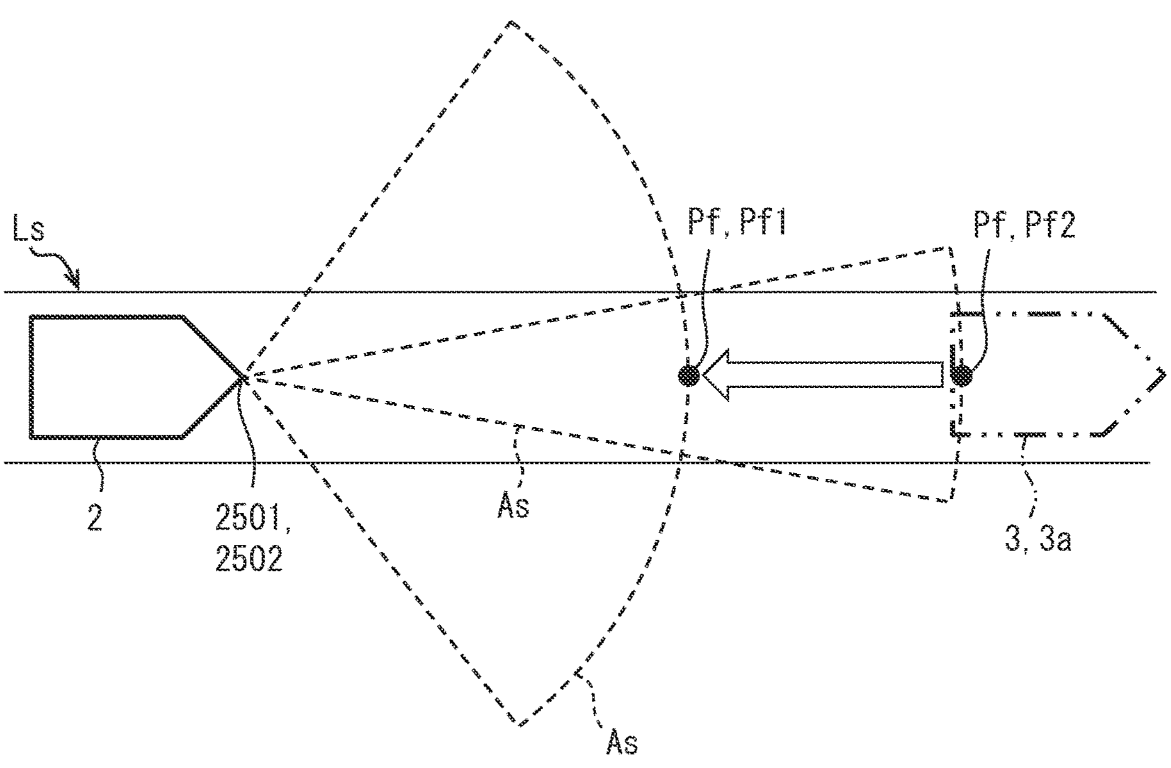
FIG. 20 is a schematic diagram showing sensing under a lane structure according to a second embodiment.
Figure 21:
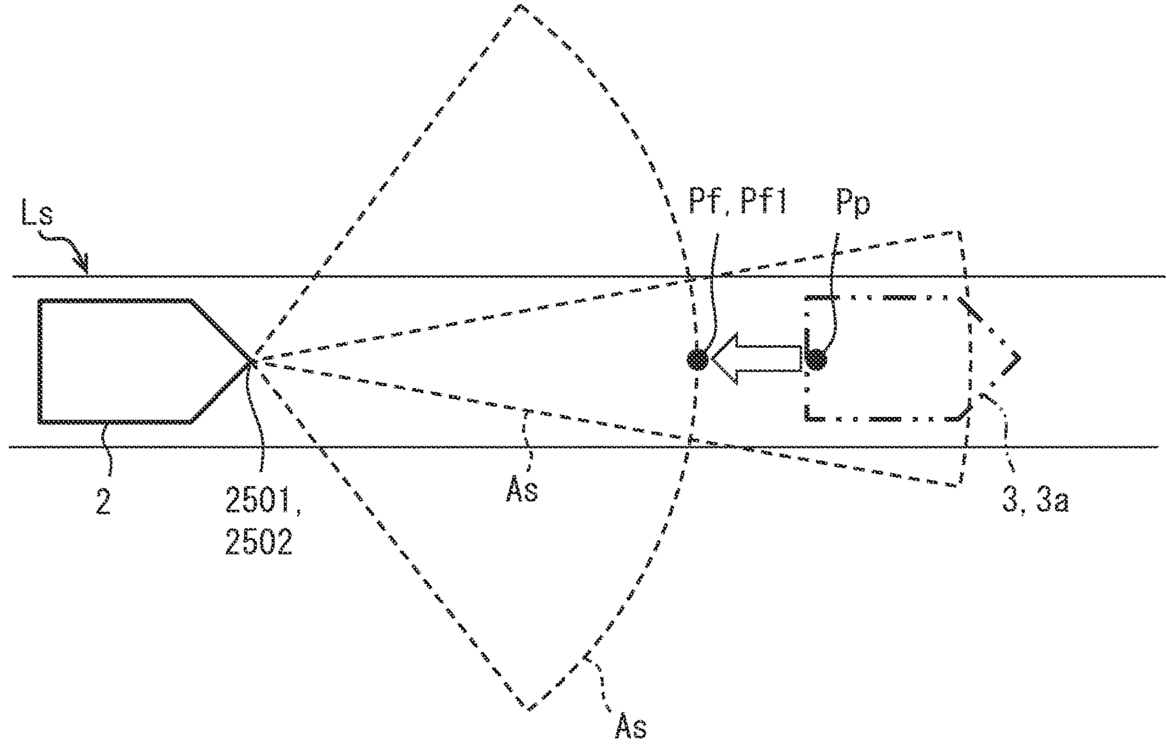
FIG. 21 is a schematic diagram showing sensing under a lane structure according to a second embodiment.

As shown in FIG. 20 and FIG. 21, the external sensor 50 of the second embodiment includes multiple longitudinal sensors 2501, 2502 having respective detection ranges As set partially overlapped one another with respect to the longitudinal direction of the host vehicle 2. A second longitudinal sensor 2502 is configured to have a longer detection limit distance, which is set along a detection angle at which the detection ranges As overlap with one another, from the host vehicle 2 compared with a detection limit distance of a first longitudinal sensor 2501. The first longitudinal sensor 2501 corresponds to a "first sensor", and the second longitudinal sensor 2502 corresponds to a "second sensor".

Figure 22:
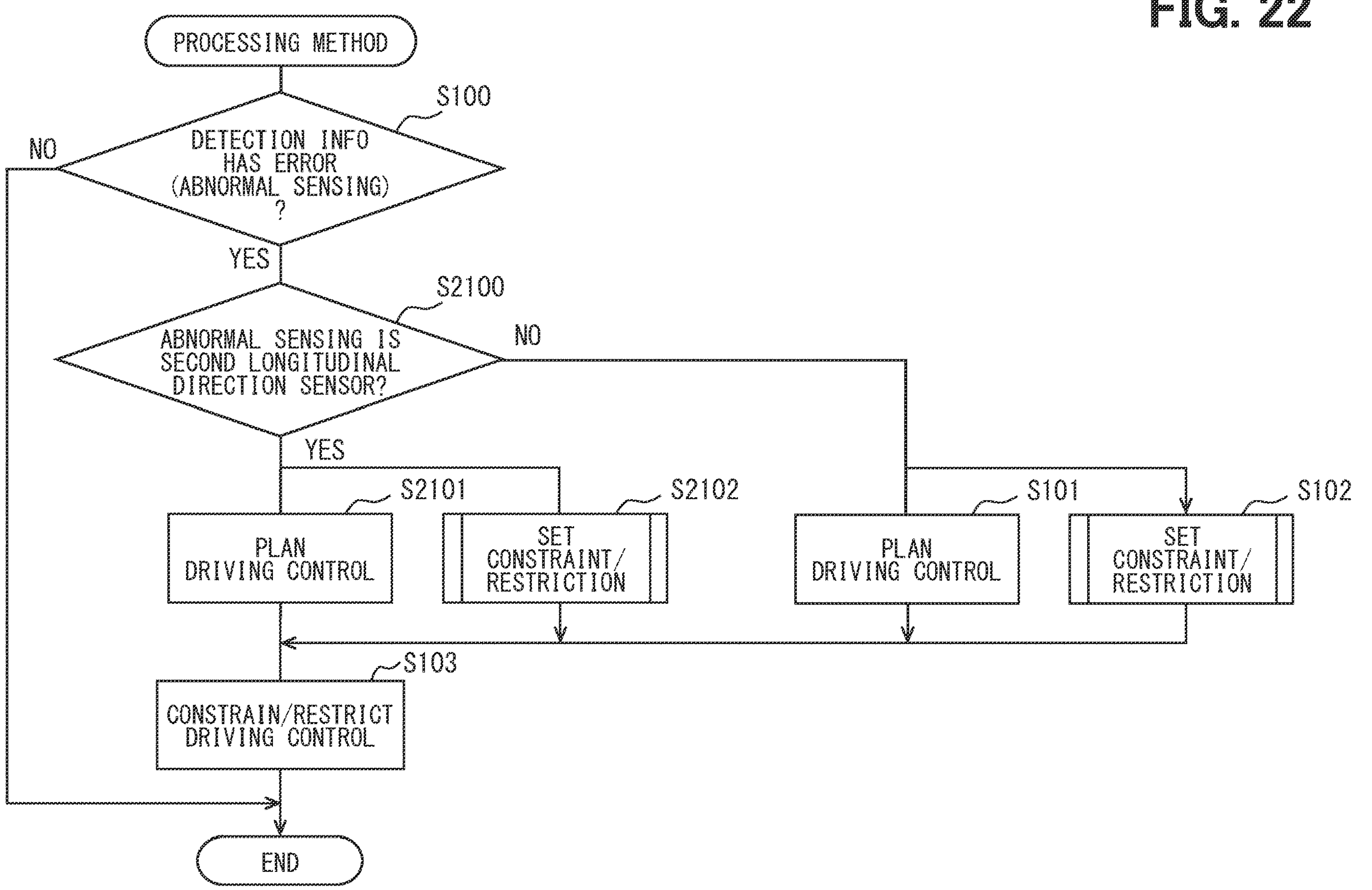
FIG. 22 is a flowchart showing a processing method according to the second embodiment.

In the processing method according to the second embodiment, when the process determines that an abnormality is occurred in the detection information, as illustrated in FIG. 22, the process proceeds from the abnormality occurrence determination in S100 to S2100. In S2100, the sensing block 100 determines whether the external sensor 50 in which an abnormality is determined to be occurred as a failure is the second longitudinal sensor 2502.

When the sensing block 100 determines that the external sensor 50 determined to have the sensing abnormality is other than the second longitudinal sensor 2502 in S2100, the processing method proceeds to S101 and S102 in parallel. When the sensing block 100 determines that the external sensor 50 determined to have the sensing abnormality is the second longitudinal sensor 2502 in S2100, the processing method proceeds to S2101 and S2102 in parallel. The determination at S2100 may be performed by at least one of the planning block 120 and the risk supervising block 140.

Figure 23:
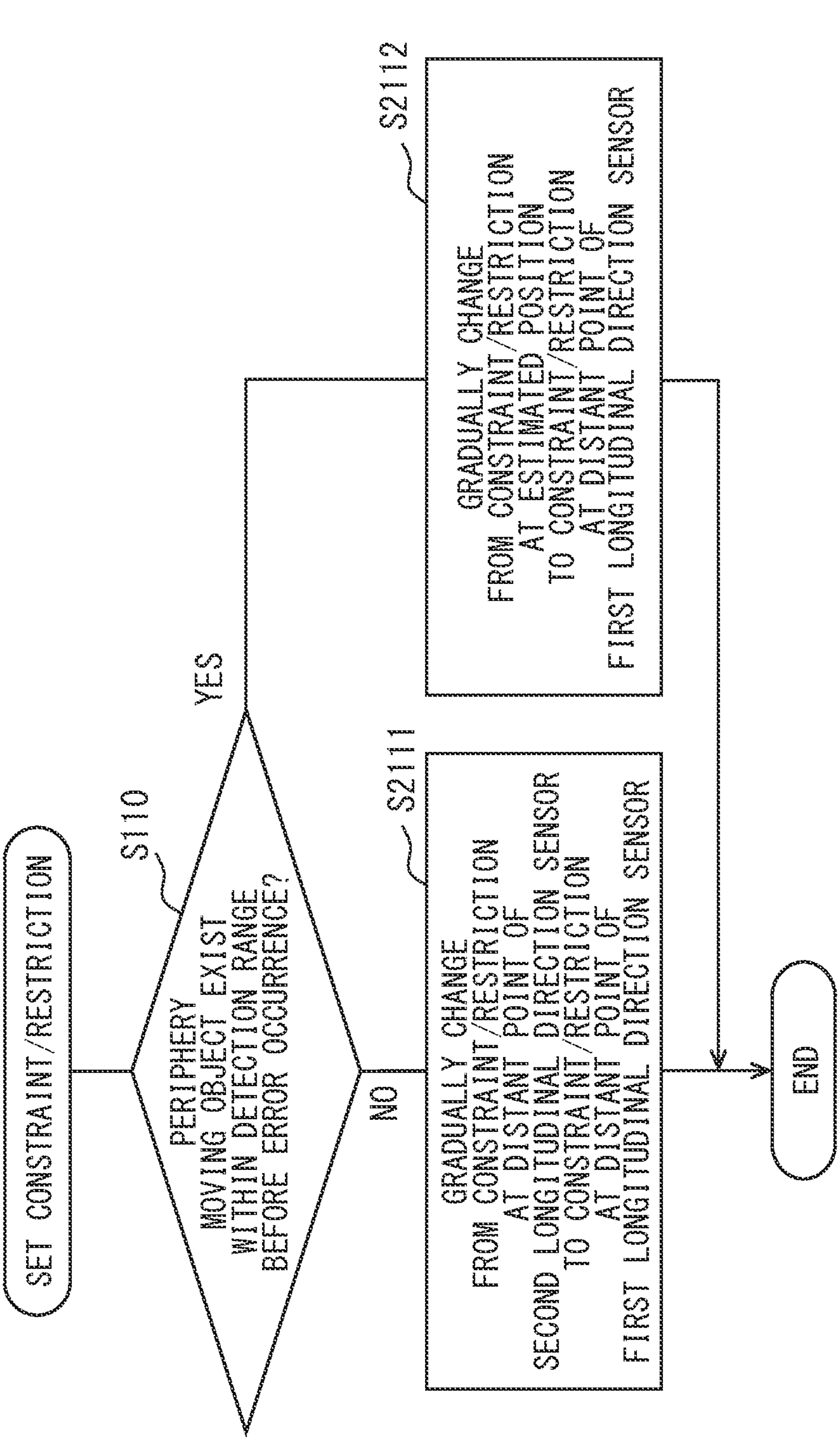
FIG. 23 is a flowchart showing a restriction or constraint setting subroutine according to the second embodiment.

In S2101 of the processing method, the planning block 120 plans degradation of the driving control in accordance with S101. In S2102 of the processing method, the risk supervising block 140 sets the constraint/restriction to be applied to the driving control planned in S2101 based on the safety model of the lane structure Ls. As shown in FIG. 23, in the process of setting the constraint/restriction at the occurrence time of abnormality, the constraint/restriction on the driving control is set according to a subroutine different from that in S101 and is further degraded compared with the normal safety function. The execution timing of S2101 and S2102 may be adjusted according to the execution time of S101 and S102.

In S110 of the constraint/restriction setting subroutine, when the risk supervising block 140 determines that a target moving object 3 is not present in the detection range As, the constraint/restriction setting subroutine proceeds to S2111. In S110, when the risk supervising block 140 determines that a target moving object 3 is present in the detection range As, the constraint/restriction setting subroutine proceeds to S2112.

In S2111 of the constraint/restriction setting subroutine, the risk supervising block 140 virtualizes the target moving object 3 at multiple positions as illustrated in FIG. 20. As the multiple virtual positions, a distant point Pf2 of the detection limit distance in the detection range As of the second longitudinal sensor 2502 in which the abnormality is occurred and a distant point Pf1 of the detection limit distance in the detection range As of the normal first longitudinal sensor 2501 are assumed. In S2111, the constraint/restriction based on the safety model between the target moving object 3 at the distant point Pf2 and the host vehicle 2 is gradually changed to the constraint/restriction based on the safety model between the target moving object 3 at the distant point Pf1 and the host vehicle 2 with a progress of the control cycle. At this time, it is assumed that the upper limit speed $v_{r,max}$ in the longitudinal direction based on the safety model or the upper limit speed $v_{1,max}$ in the lateral direction based on the safety model may gradually change from the value set at the distant point Pf2 to the value set at the distant point Pf1 with a predetermined deceleration interval (for example, 0.2 G or the like).

In S2112 of the constraint/restriction setting subroutine, the risk supervising block 140 virtualizes the target moving object 3 at multiple positions as illustrated in FIG. 21. As the multiple virtual positions, an estimated position Pp based on a presence position of the target moving object 3 prior to abnormality occurrence in the detection range As of the second longitudinal sensor 2502 and a distant point Pf1 of the detection limit distance in the detection range As of the normal first longitudinal sensor 2501 are assumed. In S2112, the constraint/restriction based on the safety model between the target moving object 3 at the estimated position Pp and the host vehicle 2 is gradually changed to the constraint/restriction based on the safety model between the target moving object 3 at the distant point Pf1 and the host vehicle 2 with a progress of the control cycle. At this time, it is assumed that the upper limit speed $v_{r,max}$ in the longitudinal direction based on the safety model or the upper limit speed $v_{1,max}$ in the lateral direction based on the safety model may gradually change from the value set at the estimated position Pp to the value set at the distant point Pf1 with a predetermined deceleration interval (for example, 0.2 G or the like).

In S2111, S2112, violation of the safety envelope may be determined similar to S111. As shown in FIG. 22, the processing method proceeds from S2101 and S2102 to a common S103, and from S101 and S102 to a common S103. In the second embodiment, in addition to the principle according to the first embodiment, it is possible to secure the accuracy of the driving control by setting a proper constraint/restriction for each sensing abnormality of the multiple sensors 2501 and 2502 having different detection limit distances from one another.

Third Embodiment

A third embodiment is a modification of the first embodiment.

Figure 24:
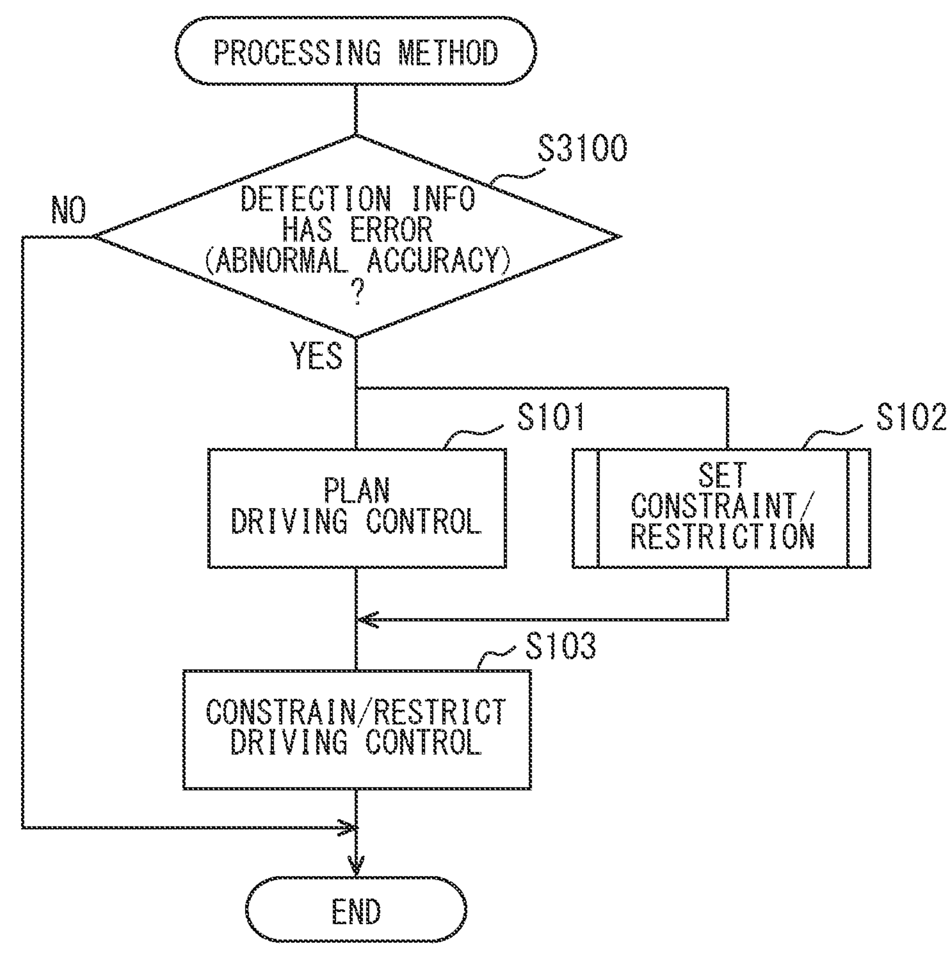
FIG. 24 is a flowchart showing a processing method according to a third embodiment.

As shown in FIG. 24, in the processing method of the third embodiment, S3100 is executed instead of S100 described above. The abnormality monitored by the sensing block 100 in S3100 includes accuracy abnormality of information related to a distance to the target moving object 3 included in the detection information. Examples of the accuracy abnormality may include an abnormality in which the sensing block 100 fails to generate normal distance information due to at least one of an abnormality of a millimeter wave radar that is excellent in detection of distance to the target moving object 3 in the sensor system 5, a disturbance including weather influence, a detection limit including a blind spot of the millimeter wave radar, and the like. Note that S3100 of the third embodiment may be specifically executed when an accuracy abnormality, which is also referred to as sensing abnormality, occurs in S101 of the first and second embodiments.

When the sensing block 100 determines that an abnormality of the detection information has occurred due to the accuracy abnormality in S3100, the processing method proceeds to S101 and S102 in parallel, and then proceeds to S103. In such a third embodiment, it is possible to set a proper constraint/restriction on the scene in which accuracy abnormality is occurred and ensure the accuracy of driving control based on the principle equivalent to the first embodiment.

When the sensing block 100 determines that the abnormality in the detection information is occurred due to the accuracy abnormality in S3100, the normal safety function may be executed instead of executing S102. In the normal safety function in this case, for example, a constraint/restriction such as an acceleration limit value may be set based on a safety model. In this safety model, a distance, a speed, and a direction of the target moving object 3 may be respectively assumed to be the minimum value, the maximum value, and a traveling direction opposite to the host vehicle 2 as the worst case.

Fourth Embodiment

A fourth embodiment is a modification of the first embodiment.

Figure 25:
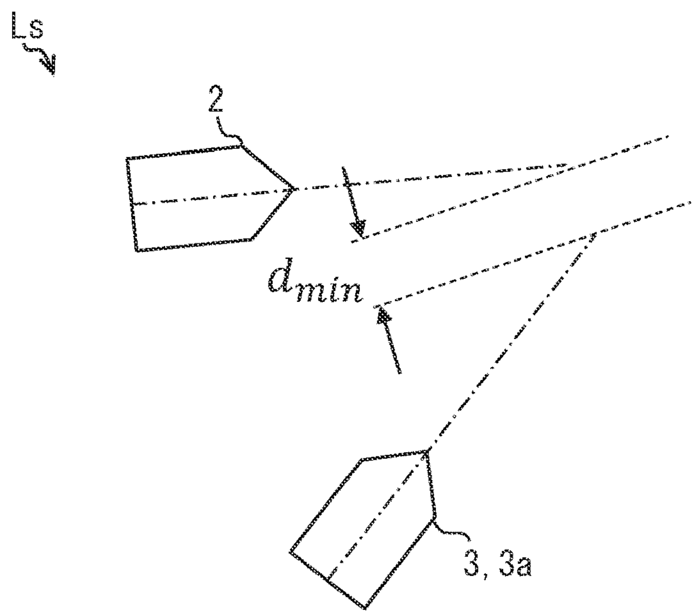
FIG. 25 is a schematic diagram showing a safety model in a virtual environment according to a fourth embodiment.
Figure 26:
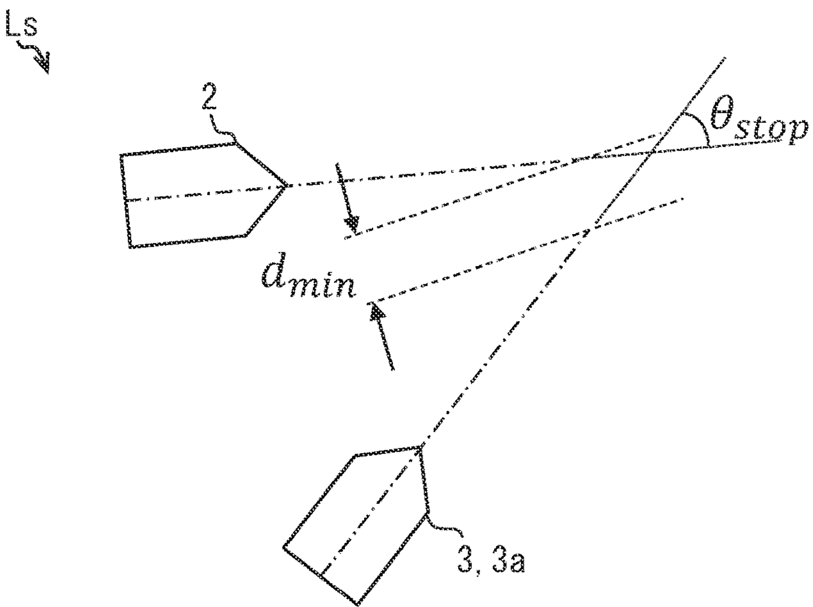
FIG. 26 is a schematic diagram showing a safety model in a virtual environment according to the fourth embodiment.

As illustrated in FIG. 25 and FIG. 26, the fourth embodiment assumes a virtual environment 4004 in which the host vehicle 2 and the target moving object 3 are not regulated in the longitudinal direction and the lateral direction by the lane structure Ls. When the target moving object 3 is a target vehicle 3*a*, the driving policy between the host vehicle 2 and the target moving object 3 in the virtual environment 4004 is defined by the following (F) to (H), for example.

(F) Each vehicle activates brake.

(G) In a scene where an unreasonable situation can be avoided by brake, brake is not activated.

(H) The vehicle is permitted to move forward in absence of preceding vehicle.

The safety model of virtual environment 4004 defines a collision between a trajectory of the host vehicle 2 and a trajectory of the target moving object 3 as an unreasonable situation. That is, the safety model of the virtual environment 4004 is defined by modeling the SOTIF in which the unreasonable risk of trajectory collision for the host vehicle 2 and the target vehicle 3 is absent. The absence situation of the trajectory collision is ensured by satisfaction of at least one of the following first and second conditions. As illustrated in FIG. 25, the first condition is that the minimum distance $d_{min}$ between the trajectory of the host vehicle 2 and the trajectory of the target moving object 3 is larger than a safety design value, which is set based on, for example, an accident responsibility rule or the like. When the first condition is satisfied, each travel distance until the host vehicle 2 and the target moving object 3 stop is always equal to or greater than a certain value. As illustrated in FIG. 26, the second condition is that an angle $\theta_{stop}$ formed by a relative position vector when the host vehicle 2 is stopped and the traveling direction of the target moving object 3 is smaller than a safety design value, which is set based on, for example, an accident responsibility rule or the like. When the second condition is satisfied, the distance until the host vehicle 2 stops on the track is always equal to or greater than a certain distance, and the target moving object 3 is present in front of the stopped host vehicle 2.

Figure 27:
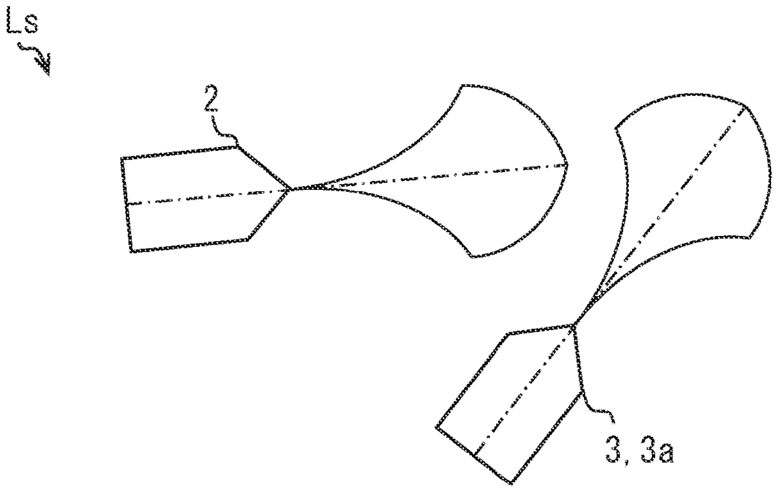
FIG. 27 is a schematic diagram showing a safety model according to the fourth embodiment.
Figure 28:
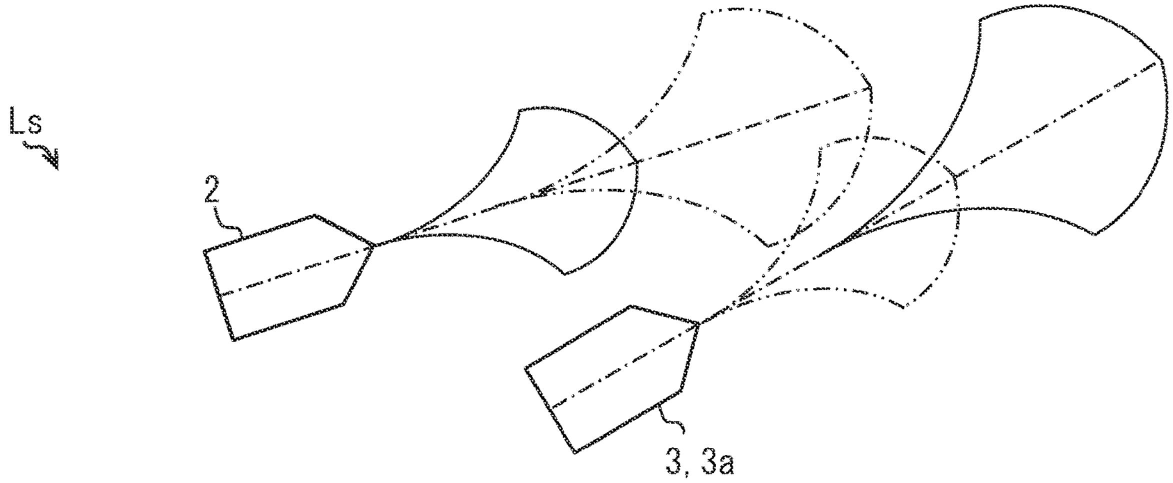
FIG. 28 is a schematic diagram showing a safety model according to the fourth embodiment.
Figure 29:
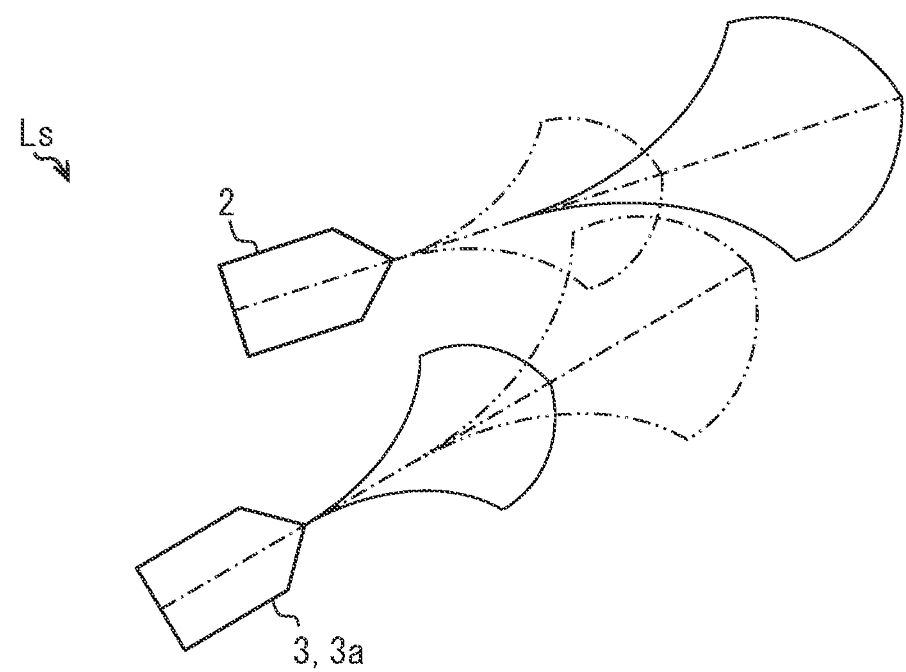
FIG. 29 is a schematic diagram showing a safety model according to the fourth embodiment.

The safety model of the virtual environment 4004 sets a safety envelope that does not lead to an unreasonable situation, such as trajectory collision. The safety envelope is secured by establishment of any one of the following first to third safety states. As illustrated in FIG. 27, a first safety state is a state in which collision between the trajectories does not occur in reachable ranges of the host vehicle 2 and the target moving object 3 before the host vehicle 2 and the target moving object 3 stop together. As illustrated in FIG. 28, a second safety state is a state in which, when the host vehicle 2 performs a stop operation such as braking, for example, and the target moving object 3 moves forward without braking, a collision between the trajectories does not occur in reachable ranges (solid line ranges in FIG. 28) of the host vehicle 2 and the target moving object 3. When the target moving object 3 executes the stop operation and the host vehicle 2 moves forward without stop or brake, the trajectories of them may collide with one another. In the second state, a situation in which the trajectories collide with one another in the reachable ranges of the host vehicle and the target moving object (the two-dot chain line ranges in FIG. 28) can be avoided. As illustrated in FIG. 29, a third safe state is a state in which, when the target moving object 3 executes the stop operation and the host vehicle 2 moves forward without brake or stop, a collision between the trajectories does not occur in the reachable ranges of the host vehicle and the target moving object (the solid line ranges in FIG. 29). When the host vehicle 2 executes the stop operation and the target moving object 3 moves forward without brake or stop, the trajectories of them may collide with one another. In the third state, a situation in which the trajectories collide with one another in the reachable ranges of the host vehicle 2 and the target moving object 3 (the ranges indicated by the two-dot chain lines in FIG. 29) can be avoided.

The safety model of the virtual environment 4004 assumes the following first to third actions as proper rational actions to be taken by the host vehicle 2 even when an unreasonable situation occurs. As a first action, in a case where both the host vehicle 2 and the target moving object 3 fall into an unreasonable situation from a state of being completely stopped, when the target moving object 3 is not located in front of the host vehicle 2, the host vehicle 2 may move and separate from the target moving object 3. At this time, it is desirable that the host vehicle 2 moves forward at a higher speed than the target moving object 3. In the first action, when the target moving object 3 is located in front of the host vehicle 2 even in a case where the host vehicle 2 and the target moving object 3 fall from the completely stopped state to the unreasonable situation, the host vehicle 2 may continue the completely stopped state until the unreasonable situation is absent. As a second action, when the host vehicle 2 falls into an unreasonable situation from the second or third state described above, the host vehicle 2 may continue to move forward unless the target moving object 3 is not in stop state. In the second action, when the target moving object 3 is stopped while the host vehicle 2 continues to move forward, the host vehicle 2 may further continue to move forward if the target moving object 3 is not located in front of the host vehicle. In the second action, in a case where the target moving object 3 is stopped while the host vehicle 2 continues to move forward, if the target moving object 3 is located in front of the host vehicle 2, the host vehicle 2 may execute stop operation. In a third action, the host vehicle 2 executes the stop operation in a case other than the first and second actions. Whether or not the target moving object 3 is located in front of the host vehicle 2 in the first and second actions may be determined based on the second condition described above.

Figure 30:
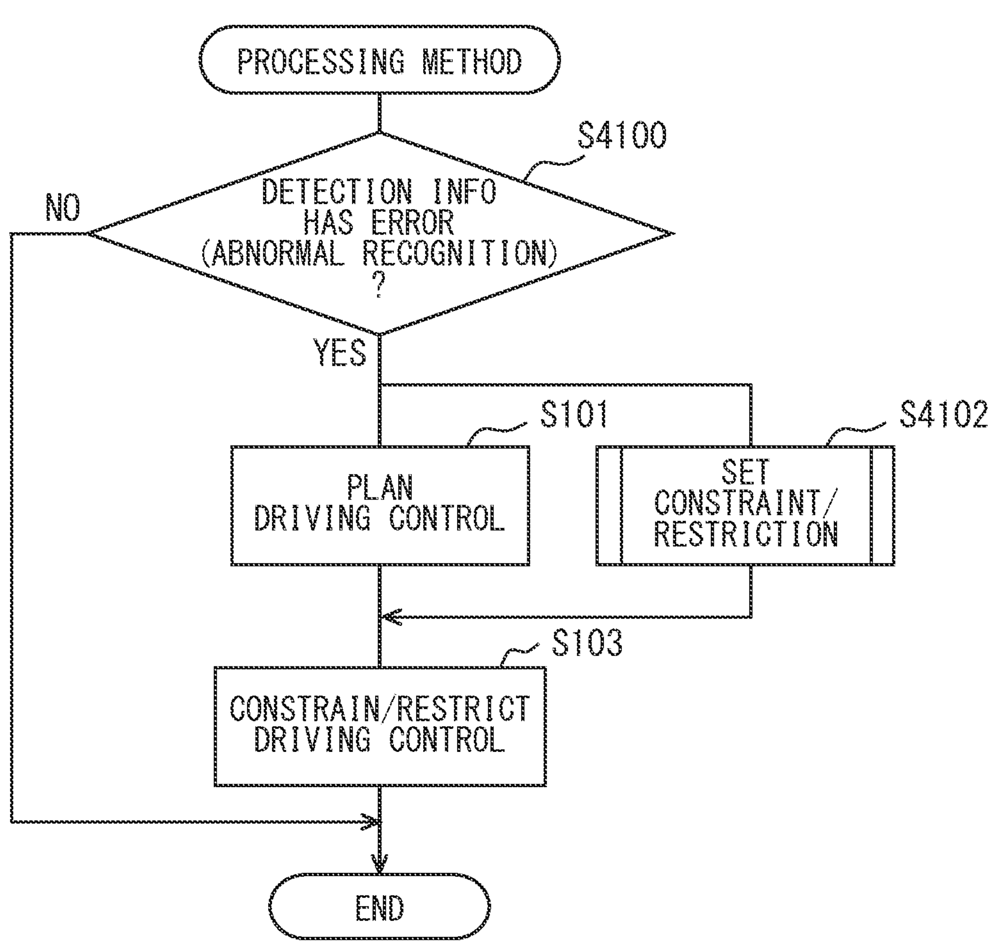
FIG. 30 is a flowchart showing a processing method according to the fourth embodiment.

As shown in FIG. 30, in the processing method of the fourth embodiment, S4100 and S4102 are executed instead of S100 and S102. The abnormality monitored by the sensing block 100 in S4100 includes recognition abnormality of information related to a type of the target moving object 3 included in the detection information. Examples of the recognition abnormality may include an abnormality in which the sensing block 100 fails to generate normal recognition information due to at least one of an abnormality of a camera that is excellent in detection of type of the target moving object 3 in the sensor system 5, a disturbance including weather influence, a detection limit including a blind spot of the camera, and the like. Note that S4100 of the fourth embodiment may be specifically executed when a recognition abnormality, which is also referred to as sensing abnormality, occurs in S101 of the first and second embodiments.

Figure 31:
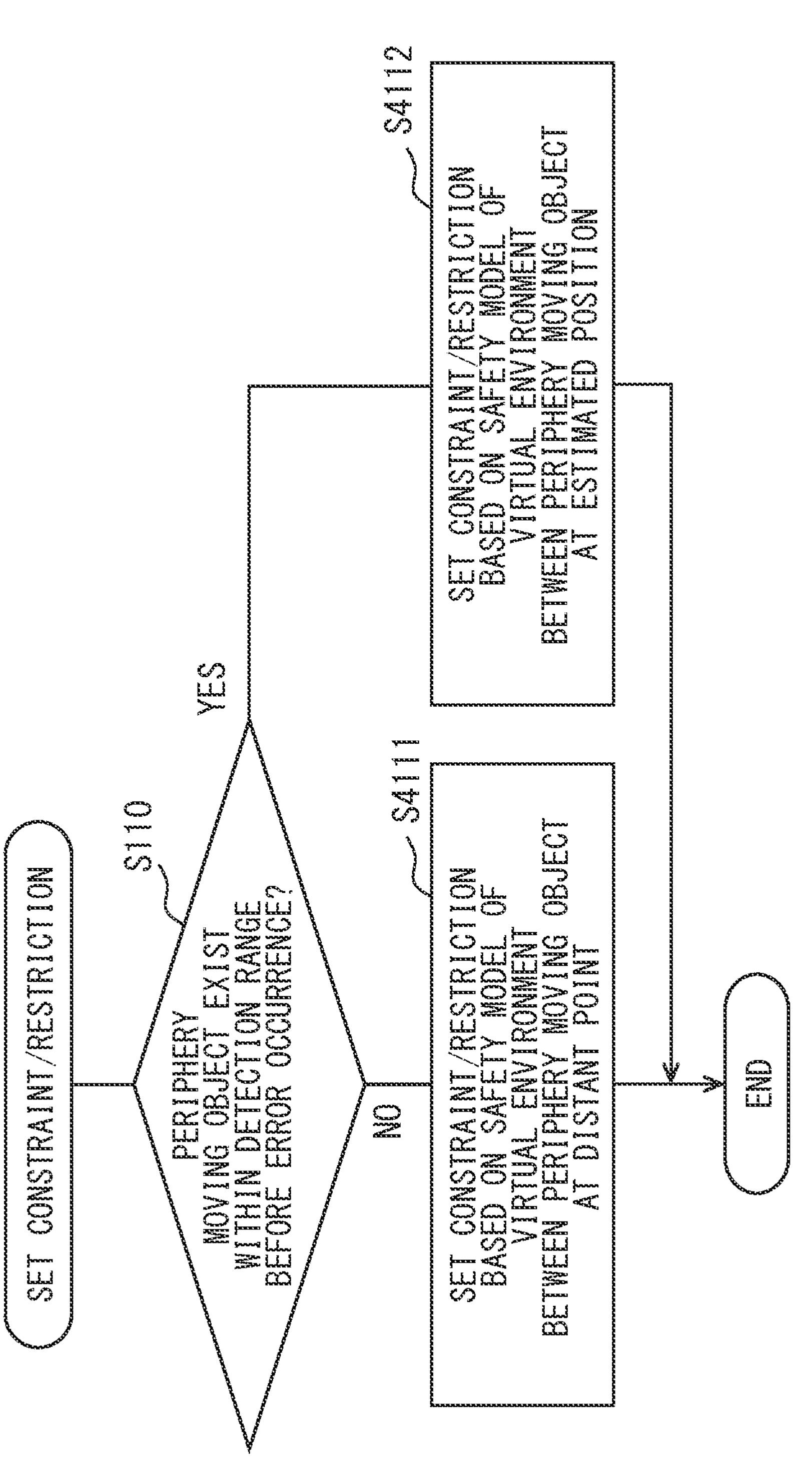
FIG. 31 is a flowchart showing a restriction or constraint setting subroutine according to the fourth embodiment.

When the sensing block 100 determines that an abnormality of the detection information has occurred due to the recognition abnormality in S4100, the processing method proceeds to S101 and S4102 in parallel, and then proceeds to S103. In S4102 of the processing method, the risk supervising block 140 sets the constraint/restriction to be applied to the driving control planned in S101 based on the safety model of the virtual environment 4004 instead of the safety model of the lane structure Ls. By executing a subroutine shown in FIG. 31, the constraint/restriction setting at the occurrence time of abnormality due to recognition abnormality can further degrade the constraint/restriction on the driving control compared with the normal time safety function. The execution timing of S101 and S4102 may be adjusted according to the execution time of S101 and S102.

In S110 of the constraint/restriction setting subroutine, when the risk supervising block 140 determines that a target moving object 3 is not present in the detection range As of the abnormality occurrence target, the constraint/restriction setting subroutine proceeds to S4111. In S110, when the risk supervising block 140 determines that a target moving object 3 is present in the detection range As, the constraint/restriction setting subroutine proceeds to S4112.

Figure 32:
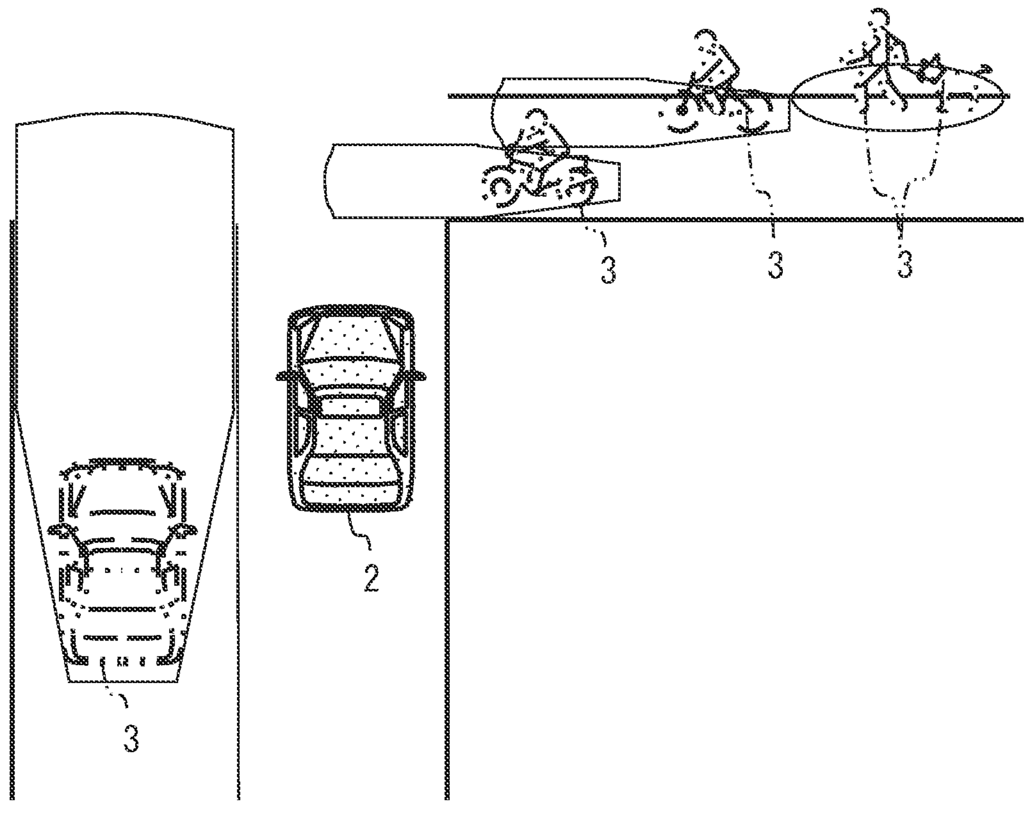
FIG. 32 is a schematic diagram showing a safety model according to the fourth embodiment.

In S4111 of the constraint/restriction setting subroutine, the risk supervising block 140 sets a constraint/restriction on the driving control of the host vehicle 2 based on the safety model of the virtual environment 4004 between the host vehicle 2 and the target moving object 3 assumed to be located at the virtual position of distant point Pf as similar as in S111. The constraint/restriction is set in the longitudinal direction or the lateral direction of the host vehicle 2 according to the detection range As of the abnormality occurrence target even in the case of the virtual environment 4004. In the constraint/restriction setting based on the safety model of the virtual environment 4004, the target moving object 3 may be assumed to be a specific object among vulnerable road users according to the scene, such as a pedestrian having a high risk that the host vehicle 2 is responsible for an accident. In this case, in the setting of the safety envelope based on the safety model, the safety distance of the assumed specific object may be estimated. In the constraint/restriction setting under the safety model of the virtual environment 4004, the target moving object 3 may be assumed to be an unidentified object (unknown) as illustrated in FIG. 32. In this case, in the setting of the safety envelope based on the safety model, a long safety distance in the traveling direction of the assumed unidentified object may be estimated.

Figure 33:
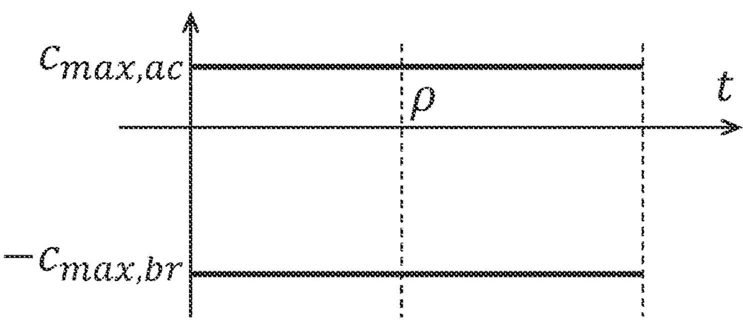
FIG. 33 is a graph showing a safety model according to the fourth embodiment.
Figure 34:
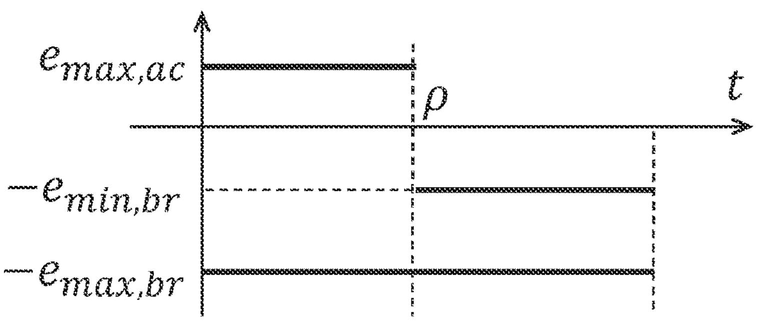
FIG. 34 is a graph showing a safety model according to the fourth embodiment.

The limit value assumed as the constraint/restriction in the case of the longitudinal direction may be calculated as a function value related to acceleration/deceleration profile defined based on the safety model as illustrated in FIG. 33 and FIG. 34. That is, in the case of the longitudinal direction, the limit value of the acceleration corresponds to the constraint/restriction. In the calculation of the limit value in the longitudinal direction, $c_{max,ac}$ is the maximum acceleration in the forward movement of the host vehicle 2. $c_{max,br}$ is the maximum deceleration in the forward movement of the host vehicle 2. $e_{max,ac}$ is the maximum acceleration in the stop motion of the host vehicle 2. $e_{max,br}$ is the maximum deceleration in the stop motion of the host vehicle 2. $e_{min,br}$ is the minimum deceleration in the stop motion of the host vehicle 2. ρ is the response time of the host vehicle 2.

Figure 35:
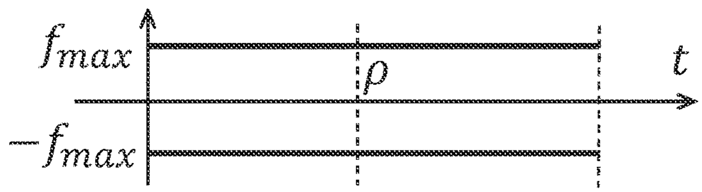
FIG. 35 is a graph showing a safety model according to the fourth embodiment.
Figure 36:
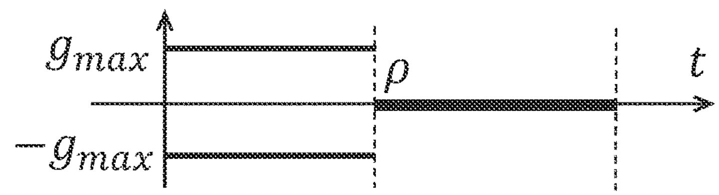
FIG. 36 is a graph showing a safety model according to the fourth embodiment.

The limit value assumed as the constraint/restriction in the lateral direction is calculated as at least one of the function values of the yaw rate profile or the curvature change rate profile defined based on the safety model as illustrated in FIG. 35 and FIG. 36. That is, in the case of the lateral direction, at least one of the limit values of the yaw rate or the trajectory curvature change rate is constrained/restricted. When calculating the limit value in the lateral direction, $f_{max}$ corresponds to the maximum value of the yaw rate applied to the host vehicle 2. $g_{max}$ is the maximum value of the temporal change rate in the trajectory in which the curvature of the host vehicle 2 changes. ρ is the response time of the host vehicle 2.

In S4112 of the constraint/restriction setting subroutine, the risk supervising block 140 sets a constraint/restriction on the driving control of the host vehicle 2, similar to S4111, based on the safety model of the virtual environment 4004 between the host vehicle 2 and the target moving object 3 assumed to be located at the estimated position Pp as the virtual position similar as in S112. In S4111, S4112, violation of the safety envelope may be determined similar to S111. In the fourth embodiment, it is possible to set a proper constraint/restriction on the scene in which recognition abnormality is occurred and ensure the accuracy of driving control based on the principle equivalent to the first embodiment.

Fifth Embodiment

A fifth embodiment is a modification of the fourth embodiment.

Figure 37:
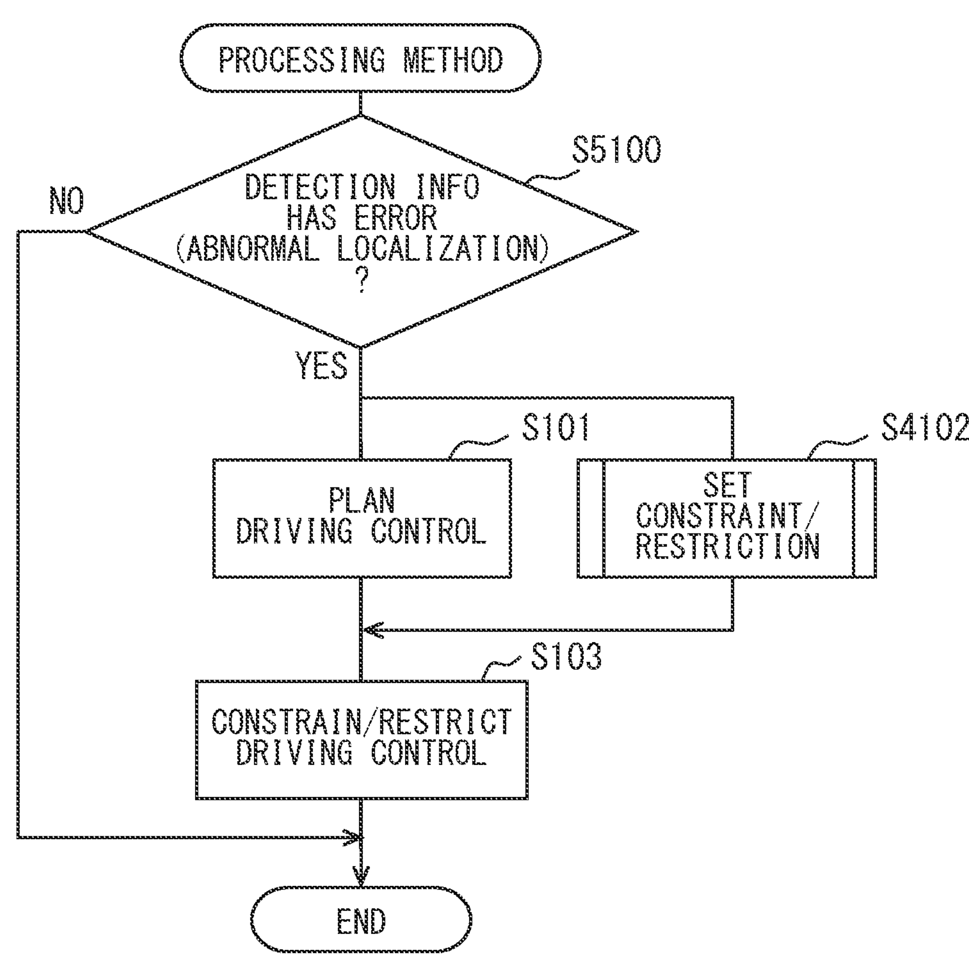
FIG. 37 is a flowchart showing a processing method according to a fifth embodiment.

As shown in FIG. 37, in the processing method of the fifth embodiment, S5100 is executed instead of S100 described above. The abnormality monitored by the sensing block 100 in S5100 includes a localization abnormality of the position information of the host vehicle 2 included in the detection information. Examples of the localization abnormality include an abnormality in which the sensing block 100 fails to generate normal localization information due to at least one of a failure of map information in the map DB 7, a transmission failure including a transmission delay of map information by the V2X communication executed by the communication system 6, a reception failure of a positioning signal by the positioning purpose communication executed by the communication system 6, and a sensing abnormality related to a self-state quantity of the sensor system 5. Note that S5100 of the fifth embodiment may be specifically executed in a case where localization abnormality due to sensing abnormality occurs in S101 of the first and second embodiments.

When the sensing block 100 determines that an abnormality of the detection information has occurred due to the localization abnormality in S5100, the processing method proceeds to S101 and S4102 in parallel, and then proceeds to S103. However, in the constraint/restriction setting subroutine executed in S4102 of the fifth embodiment, the safety model of the virtual environment 4004 used for the constraint/restriction setting is assumed for the target moving object 3 of the type recognized or estimated from the detection information before the occurrence of abnormality. In such a fifth embodiment, it is possible to set a proper constraint/restriction on the scene in which localization abnormality is occurred and ensure the accuracy of driving control based on the principle equivalent to the first embodiment.

Sixth Embodiment

A sixth embodiment is a modification of the first embodiment.

As shown in FIG. 38, in a control block 6160 according to the sixth embodiment, the acquisition processing of determination information regarding the safety envelope from the risk supervising block 140 is omitted. The planning block 6120 according to the sixth embodiment acquires determination information on the safety envelope from the risk supervising block 140. The planning block 6120 plans the driving control of the host vehicle 2 similar to the planning block 120 when the determination information that the safety envelope is not violated is acquired. When the determination information indicating that the safety envelope is violated is acquired, the planning block 6120 imposes a constraint/restriction on the driving control based on the determination information at the stage of planning the driving control similar to the planning block 120. That is, the planning block 6120 imposes a constraint/restriction on the planned driving control. In either case, the control block 6160 performs the driving control of the host vehicle 2 planned by the planning block 6120.

Figure 39:
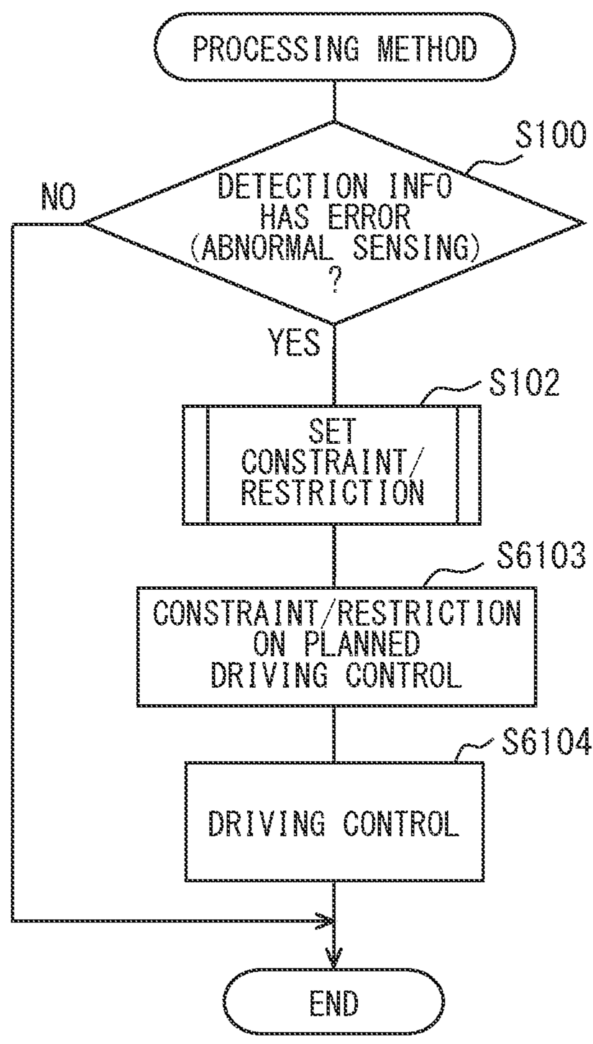
FIG. 39 is a flowchart showing a restriction or constraint setting subroutine according to the sixth embodiment.

As shown in FIG. 39, the processing method of the sixth embodiment does not execute S101, and executes S6103 and S6104 sequentially instead of S103. In S6103, the planning block 6120 applies the constraint/restriction, which is set by the risk supervising block 140 in S111 or S112 of the constraint/restriction setting subroutine S102, to the driving control to be planned. That is, it can be said that the planning block 6120 plans, in S6103, the degradation of driving control. In S6104, the control block 6160 executes the driving control to which the constraint/restriction is applied in S6103. By limiting the longitudinal speed of the host vehicle 2 to equal to or lower than the upper limit speed $v_{r,max}$ or limiting the lateral speed of the host vehicle 2 to equal to or lower than the upper limit speed $v_{1,max}$, it is possible to avoid violation of the safety envelope. Thus, in the sixth embodiment, it is possible to secure the accuracy of driving control by applying a proper constraint/restriction to the driving control based on the principle equivalent to the first embodiment.

Seventh Embodiment

A seventh embodiment is a modification of the first embodiment.

As shown in FIG. 40, in a control block 7160 according to the seventh embodiment, the acquisition processing of determination information regarding the safety envelope from the risk supervising block 7140 is omitted. Therefore, the risk supervising block 7140 of the seventh embodiment acquires information representing the result of the driving control executed by the control block 7160 for the host vehicle 2. The risk supervising block 7140 evaluates the driving control by performing, based on the safety envelope, safety determination on the results of the driving control.

Figure 41:
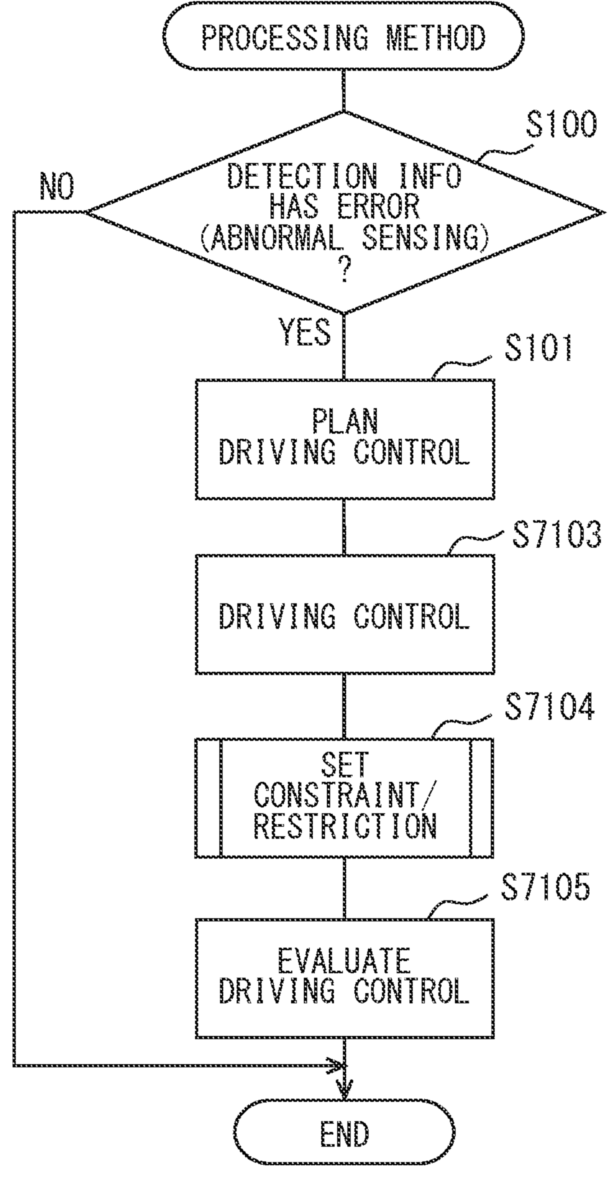
FIG. 41 is a flowchart showing a processing method according to the seventh embodiment.

As shown in FIG. 41, the processing method of the seventh embodiment does not execute S102, and executes S7103, S7104, and S7105 sequentially instead of S103. In S7103, the control block 7160 executes the driving control planned in S101. In S7104, the risk supervising block 7140 sets the constraint/restriction on the driving control set in S7103 by executing a constraint/restriction subroutine similar to S102. In S7105, the risk supervising block 7140 evaluates the driving control set in 7103 based on the upper limit speed $v_{r,max}$ in the longitudinal direction or the upper limit speed $v_{1,max}$ in the lateral direction, which are set as constraints. At this time, when the host vehicle 2 exceeds the upper limit speed $v_{r,max}$ or exceeds the upper limit speed $v_{1,max}$, it is determined that there is a violation of the safety envelope as an evaluation of the driving control.

The process in S7104 and S7105 may be executed each time one control cycle of the information indicating the result of the driving control in S7103 is stored in the memory 10. As described above, S7104 may be executed each time one control cycle information indicating the result of the driving control in S7103 is stored in the memory 10. S7105 may be executed after multiple control cycle information indicating the results of driving control in S7103 are stored in the memory 10. The process in S7104 and S7105 may be executed after multiple control cycle information indicating the results of the driving control in S7103 are stored in the memory 10. In the seventh embodiment, it is possible to properly set driving control and evaluate the set driving control, and ensure the accuracy of driving control based on the principle equivalent to the first embodiment.

Eighth Embodiment

An eighth embodiment is a modification of the first and seventh embodiments.

Figure 43:
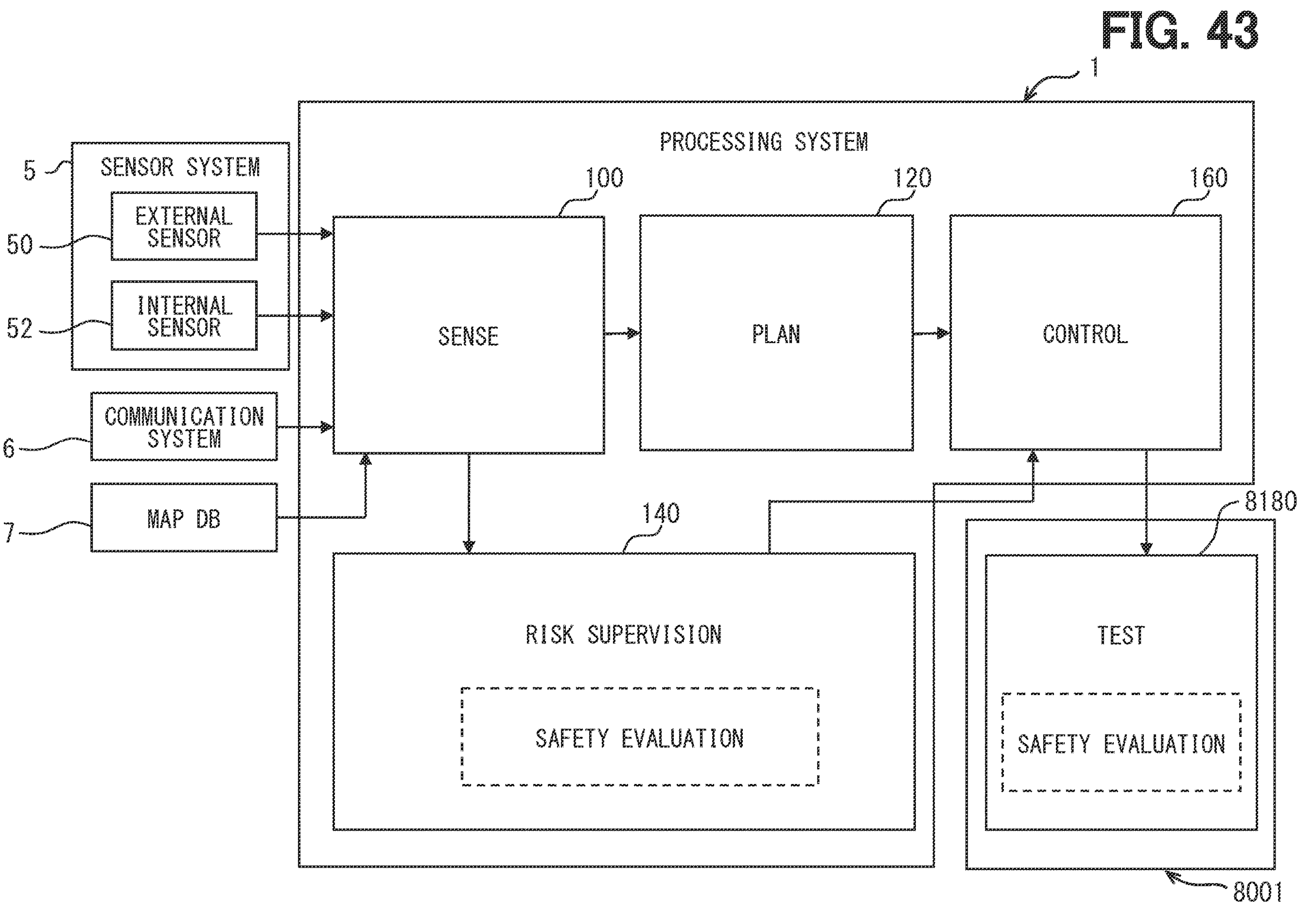
FIG. 43 is a block diagram showing a processing system according to the eighth embodiment.

As shown in FIG. 42 and FIG. 43, in the eighth embodiment, which is a modification of the first embodiment from the viewpoint of the processing system 1, a test block 8180 that tests the driving control executed by the processing system 1 is added, for example, for safety approval purpose or the like. The test block 8180 is provided with functionality similar to the sensing block 100 and the risk supervising block 140. The test block 8180 may be implemented by the processing system 1 shown in FIG. 42 executing a test program that is added to the processing program functioning as the blocks 100, 120, 140, 160. The test block 8180 may be implemented by a test processing system 8001 as shown in FIG. 43 which is different from the processing system 1, and the test processing system 8001 may execute a test program that is different from the processing program functions as the blocks 100, 120, 140, 160. Here, the test processing system 8001 may be a dedicated computer that has at least one memory 10 and processor 12 and is connected to the processing system 1 to test the driving control (a connection example through the communication system 6 is not shown).

Figure 44:
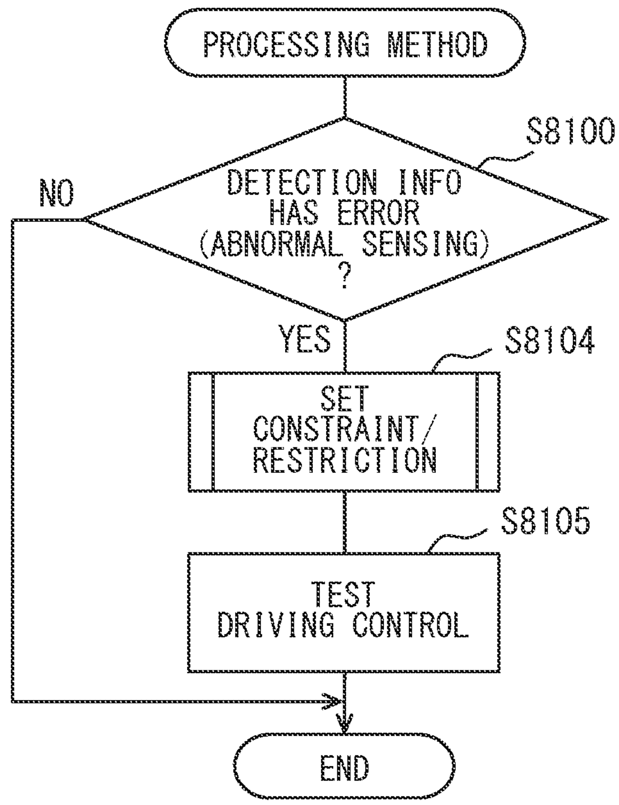
FIG. 44 is a flowchart showing a processing method according to the eighth embodiment.

As shown in FIG. 44, in the eighth embodiment, which is a modification of the seventh embodiment in terms of the processing method, the process does not execute S101 and S7103, and executes S8100, S8104, and S8105, which correspond to S100, S7104, and S7105, respectively. At S8100, the test block 8180 monitors and determines abnormality in the detection information similar to S100. In FIG. 41 and FIG. 42, illustration of data acquisition path for monitoring and determining abnormality in detection information is omitted.

In S8104, the test block 8180 sets a constraint/restriction on the driving control set in S103 by the processing system 1 using the constraint/restriction subroutine similar to S102 or S7104. In S8105, the test block 8180 tests the driving control set in S103 by the processing system 1 similar to test executed in S7105. At this time, when the host vehicle 2 exceeds the upper limit speed $v_{r,max}$ or exceeds the upper limit speed $v_{1,max}$, it is determined that there is a violation of the safety envelope as a test result of the driving control.

The process in S8104 and S8105 may be executed each time one control cycle of the information indicating the result of the driving control in S103 is stored in the memory 10 of the processing system 1 or the test processing system 8001. As described above, S8104 may be executed each time one control cycle information indicating the result of the driving control in S103 is stored in the memory 10 of the processing system 1 or the test processing system 8001. S8105 may be executed after multiple control cycle information indicating the results of driving control in S103 are stored in the memory 10 of the processing system 1 or the test processing system 8001. The process in S8104 and S8105 may be executed after multiple control cycles of the information indicating the results of the driving control in S103 are stored in the memory 10 of the processing system 1 or the test processing system 8001. In the eighth embodiment, it is possible to properly set driving control and evaluate the set driving control, and ensure the accuracy of driving control based on the principle equivalent to the first embodiment.

Ninth Embodiment

A ninth embodiment is a modification of the sixth embodiment.

As shown in FIG. 45, the planning block 9120 according to the ninth embodiment incorporates the function of the risk supervising block 140 as a risk supervising sub-block 9140. The planning block 9120 according to the ninth embodiment plans the driving control of the host vehicle 2 similar the planning block 120 when the determination information indicating that the safety envelope is not violated is acquired by the risk supervising sub-block 9140. When the determination information indicating that the safety envelope is violated is acquired by the risk supervising sub-block 9140, the planning block 9120 imposes a constraint/restriction on the driving control based on the determination information at the stage of planning the driving control similar to the planning block 120. That is, the planning block 9120 imposes a constraint/restriction on the planned driving control. In either case, the control block 6160 performs the driving control of the host vehicle 2 planned by the planning block 9120.

In such a processing method of the ninth embodiment, the risk supervising sub-block 9140 included in the planning block 9120 executes S102. In S6103, the planning block 9120 applies the constraint/restriction, which is set by the risk supervising sub-block 9140 in S111 or S112 of the constraint/restriction setting subroutine S102, to the driving control to be planned. In the ninth embodiment, it is possible to secure the accuracy of driving control by applying a proper constraint/restriction to the driving control based on the principle equivalent to the first embodiment.

Other Embodiments

Although multiple embodiments have been described above, the present disclosure is not construed as being limited to those embodiments, and can be applied to various embodiments and combinations within a scope that does not depart from the spirit of the present disclosure.

The dedicated computer of the processing system 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

Figure 46:
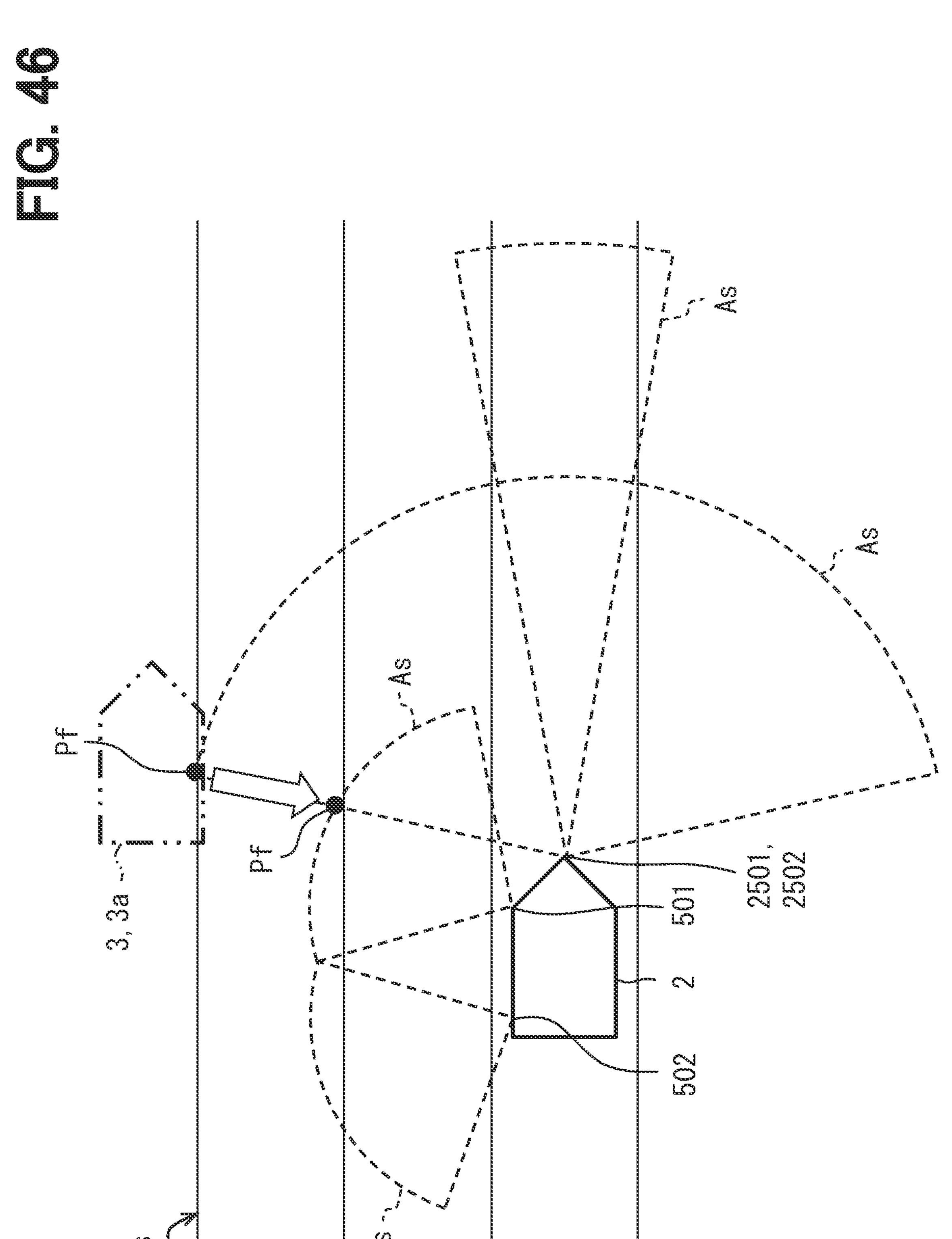
FIG. 46 is a schematic diagram showing a modification example of FIG. 20.

As illustrated in FIG. 46, in the second embodiment, in the detection range As of the first longitudinal sensor 2501, which extends from the longitudinal direction to the lateral direction of the host vehicle, the detection limit distance of the first longitudinal sensor 2501 from the host vehicle 2 may be set to be longer than a detection limit distance of the first lateral sensor 501 within a detection angle partially overlapping with the detection range As of the first lateral sensor 501. In the constraint/restriction setting subroutine of this case, the gradual change of the constraint/restriction may be assumed from the distant point Pf or the estimated position Pp of the detection limit distance in the detection range As of the first longitudinal sensor 2501 to the distant point Pf of the detection limit distance in the detection range As of the first lateral sensor 501. Further, each distant point Pf in this case may be defined as a point located at a detection limit distance, which is the farthest distance within a detection angle at which the detection ranges As overlap with one another, from the host vehicle. In this case, the first lateral sensor 501 corresponds to a "first sensor", and the first longitudinal sensor 2501 corresponds to a "second sensor".

The second to fifth embodiments may be modified according to any one of the sixth, seventh, eighth, or ninth embodiments. The processing methods according to at least two of the third to fifth embodiments may be executed in parallel as a modification.

In addition to the above-described embodiments and modifications, the present disclosure may be implemented in forms of a device mountable on a host moving object and including at least one processor 12 and at least one memory 10, a processing circuit (for example, a processing ECU, etc.) or a semiconductor device (eg, semiconductor chip, etc).

What is claimed is:

1. A processing method executed by a processor for performing a process related to a driving control of a host moving object, the processing method comprising:

monitoring an abnormality in detection information that is generated by detecting an internal and external environment of the host moving object; and planning the driving control of the host moving object, wherein the monitoring of the abnormality includes:

in response to determining the abnormality has occurred, setting a constraint or restriction on the driving control to maintain operation of the host moving object within a determined level of risk, wherein the constraint or restriction on the driving control is set according to the detection information using a safety model, which is in compliance with a driving policy and is generated by modeling safety of intended functionality as a computer program that executes a process according to a mathematical model, the driving policy being a strategy or rule defining control behaviors of a vehicle acceptable within a vehicle level; and intervening in the planned driving control by the set constraint or restriction, wherein the host moving object is equipped with a sensor system that generates the detection information as a generation source, and in response to determining the abnormality has occurred in a scene where a target moving object does not exist within a detection range defined by the sensor system, the safety model sets the constraint or restriction based on a reasonable action that does not cause an unreasonable situation between a virtual moving object, which is estimated to be located at a detection limit distance of the sensor system.

2. The processing method according to claim 1, wherein, in the setting of constraint or restriction, the safety model sets the constraint or restriction based on a reasonable action that is estimated corresponding to an occurrence scene of the abnormality.

3. The processing method according to claim 1, wherein the sensor system includes a first sensor and a second sensor, a detection limit distance of the second sensor from the host moving object is set to be longer than a detection limit distance of the first sensor, and in response to determining the abnormality has occurred in the second sensor in a scene where the target moving object does not exist within the detection limit distance of the first sensor and the detection limit distance of the second sensor, the setting of constraint or restriction includes setting a gradual change from a constraint or restriction set under a presumption that the virtual moving object is located within the detection limit distance of the second sensor to a constraint or restriction set under a presumption that the virtual moving object is located within the detection limit distance of the first sensor.

4. The processing method according to claim 3, wherein setting the gradual change includes gradually changing an upper limit speed of the host moving object from an upper limit speed value set under the presumption that the virtual moving object is located within the detection limit distance of the second sensor to an upper limit speed value set under the presumption that the virtual moving object is located within the detection limit distance of the first sensor.

5. The processing method according to claim 1, wherein, the sensor system includes a first sensor and a second sensor, a detection limit distance of the second sensor from the host moving object is set to be longer than a detection limit distance of the first sensor, and in response to determining the abnormality has occurred in the second sensor in a scene where the target moving object exists within the detection limit distance of the second sensor, the setting of constraint or restriction includes setting a gradual change from a constraint or restriction set under a presumption that the target moving object is located at an estimated position within the detection limit distance of the second sensor to a constraint or restriction set under a presumption that the virtual moving object corresponding to the target moving object is located within the detection limit distance of the first sensor.

6. The processing method according to claim 5, wherein setting the gradual change includes gradually changing an upper limit speed of the host moving object from an upper limit speed value set under the presumption that the target moving object is located at the estimated position to an upper limit speed value set under the presumption that the virtual moving object is located within the detection limit distance of the first sensor.

7. The processing method according to claim 1, wherein the abnormality includes a sensing abnormality of a sensor system, which is equipped to the host moving object and generates the detection information as a generation source.

8. The processing method according to claim 7, wherein the constraint or restriction includes a speed limit value in a longitudinal direction or a lateral direction relative to the host moving object, and the speed limit value is set based on a lane structure that constraints or restricts the host moving object in the longitudinal direction and the lateral direction.

9. The processing method according to claim 1, wherein the detection information includes a distance to a target moving object, and the abnormality includes an accuracy abnormality of information related to the distance to the target moving object.

10. The processing method according to claim 1, wherein the detection information includes information related to a type of a target moving object, and the abnormality includes a recognition abnormality of the information related to the type of the target moving object.

11. The processing method according to claim 10, wherein the constraint or restriction includes an acceleration limit value in a longitudinal direction relative to the host moving object, and the acceleration limit value is set based on a control command generated by the safety model, which estimates a virtual environment that has no constraint or restriction on the host moving object in the longitudinal direction and a lateral direction relative to the host moving object.

12. The processing method according to claim 1, wherein the detection information includes information related to a position of a target moving object, and the abnormality includes a localization abnormality of the information related to the position of the target moving object.

13. The processing method according to claim 10, wherein the constraint or restriction includes a limit value of at least one of a trajectory curvature change rate or a yaw rate in a lateral direction relative to the host moving object, and the limit value is set based on a control command generated by the safety model, which estimates a virtual environment that has no constraint or restriction on the host moving object in a longitudinal direction and the lateral direction relative to the host moving object.

14. A processing system, which executes a process related to a driving control of a host moving object, the processing system comprising a computer-readable non-transitory storage medium; and a processor, by executing a program stored in the computer-readable non-transitory storage medium, configured to:

monitor an abnormality in detection information that is generated by detecting an internal and external environment of the host moving object; and planning the driving control of the host moving object, wherein the monitoring of the abnormality includes:

in response to determining the abnormality has occurred, setting a constraint or restriction on the driving control to maintain operation of the host moving object within a determined level of risk, wherein the constraint or restriction on the driving control is set according to the detection information using a safety model, which is in compliance with a driving policy and is generated by modeling safety of intended functionality as a computer program that executes a process according to a mathematical model, the driving policy being a strategy or rule defining control behaviors of a vehicle acceptable within a vehicle level; and intervening in the planned driving control by the set constraint or restriction, wherein the host moving object is equipped with a sensor system that generates the detection information as a generation source, and in response to determining the abnormality has occurred in a scene where a target moving object does not exist within a detection range defined by the sensor system, the processor sets the constraint or restriction using the safety model based on a reasonable action that does not cause an unreasonable situation between a virtual moving object, which is estimated to be located at a detection limit distance of the sensor system.

15. A computer-readable non-transitory storage medium storing instructions of a processing program to be executed by a processor, the processor performing a process related to a driving control of a host moving object by executing the instructions, the instructions comprising:

monitoring an abnormality in detection information that is generated by detecting an internal and external environment of the host moving object; and planning the driving control of the host moving object, wherein the monitoring of the abnormality includes:

in response to determining the abnormality has occurred, setting a constraint or restriction on the driving control to maintain operation of the host moving object within a determined level of risk, wherein the constraint or restriction on the driving control is set according to the detection information using a safety model, which is in compliance with a driving policy and is generated by modeling safety of intended functionality as a computer program that executes a process according to a mathematical model, the driving policy being a strategy or rule defining control behaviors of a vehicle acceptable within a vehicle level; and intervening in the planned driving control by the set constraint or restriction, wherein the host moving object is equipped with a sensor system that generates the detection information as a generation source, and the instructions further comprise, in response to determining the abnormality has occurred in a scene where a target moving object does not exist within a detection range defined by the sensor system, setting the constraint or restriction using the safety model based on a reasonable action that does not cause an unreasonable situation between a virtual moving object, which is estimated to be located at a detection limit distance of the sensor system.

16. A processing device mountable to a host moving object and executing a process related to a driving control of the host moving object, the processing device comprising a computer-readable non-transitory storage medium; and a processor, by executing a program stored in the computer-readable non-transitory storage medium, configured to:

monitor an abnormality in detection information that is generated by detecting an internal and external environment of the host moving object; and planning the driving control of the host moving object, wherein the monitoring of the abnormality includes:

in response to determining the abnormality has occurred, setting a constraint or restriction on the driving control to maintain operation of the host moving object within a determined level of risk, wherein the constraint or restriction on the driving control is set according to the detection information using a safety model, which is in compliance with a driving policy and is generated by modeling safety of intended functionality as a computer program that executes a process according to a mathematical model, the driving policy being a strategy or rule defining control behaviors of a vehicle acceptable within a vehicle level; and intervening in the planned driving control by the set constraint or restriction, wherein the host moving object is equipped with a sensor system that generates the detection information as a generation source, and in response to determining the abnormality has occurred in a scene where a target moving object does not exist within a detection range defined by the sensor system, the processor sets the constraint or restriction using the safety model based on a reasonable action that does not cause an unreasonable situation between a virtual moving object, which is estimated to be located at a detection limit distance of the sensor system.

* * * * *